(12) United States Patent
LoSacco

(10) Patent No.: US 10,479,326 B2
(45) Date of Patent: Nov. 19, 2019

(54) MOTORIZED WINDSHIELD SCOURER

(71) Applicant: Vincent J. LoSacco, Emerson, NJ (US)

(72) Inventor: Vincent J. LoSacco, Emerson, NJ (US)

(*) Notice: Subject to any disclaimer, the term of this patent is extended or adjusted under 35 U.S.C. 154(b) by 0 days.

(21) Appl. No.: 16/034,978

(22) Filed: Jul. 13, 2018

(65) Prior Publication Data

US 2019/0023229 A1 Jan. 24, 2019

Related U.S. Application Data

(60) Provisional application No. 62/534,878, filed on Jul. 20, 2017.

(51) Int. Cl.
| B60S 1/38 | (2006.01) |
| B60S 1/34 | (2006.01) |
| B60S 1/28 | (2006.01) |
| B08B 1/00 | (2006.01) |
| B08B 1/04 | (2006.01) |
| A47L 1/02 | (2006.01) |

(Continued)

(52) U.S. Cl.
CPC . *B60S 1/38* (2013.01); *A47L 1/02* (2013.01); *B08B 1/006* (2013.01); *B08B 1/04* (2013.01); *B60S 1/0814* (2013.01); *B60S 1/28* (2013.01); *B60S 1/3463* (2013.01); *B60S 1/3848* (2013.01); *B60S 1/482* (2013.01); *B60S 1/3849* (2013.01); *B60S 2001/3827* (2013.01); *B60S 2001/3831* (2013.01)

(58) Field of Classification Search
None
See application file for complete search history.

(56) References Cited

U.S. PATENT DOCUMENTS

| 816,871 A | 7/1959 | O-Shei |
| 2,932,842 A | 4/1960 | Riester |
| 2,952,029 A | 9/1960 | Lindsay |

(Continued)

FOREIGN PATENT DOCUMENTS

| CN | 102064043 A | * 5/2011 |
| DE | 102011086750 A1 | 5/2013 |

OTHER PUBLICATIONS

EPO machine translation of CN102064043 retrieved on May 17, 2019 (Year: 2019).*

*Primary Examiner* — Eric W Golightly
(74) *Attorney, Agent, or Firm* — Walter J. Tencza, Jr.

(57) ABSTRACT

A motor-powered windshield scourer for any type of a motor-powered vehicle and or motor craft. The motorized windshield scourer may have a motor propelled appendages or a singular appendage that have replaceable scouring attachments joined to the appendages. The motor that propels the appendages can be positioned anywhere on or in the motor vehicle/craft, whether under the hood, in the cabin or elsewhere. The motor driven appendages with joined scouring attachments may be mounted on the windshield of the vehicle directly opposite of the windshield wiper blades. When turned on, the motor may move the appendages with joined attachments in a side to side and/or up and down motion across the windshield. The appendages may include an unpliable metal such as: steel, titanium, tungsten, or inconel, and the scouring attachments may include nylon scouring pads or a vinyl coated mesh attached to and covering rubber or foam.

17 Claims, 19 Drawing Sheets

(51) Int. Cl.
*B60S 1/08* (2006.01)
*B60S 1/48* (2006.01)

(56) References Cited

U.S. PATENT DOCUMENTS

| | | |
|---|---|---|
| 3,553,761 A | 1/1971 | Stevens |
| 4,999,550 A * | 3/1991 | Jones ........................ B60S 1/08 |
| | | 15/250.17 |
| 5,301,384 A | 4/1994 | Perry |
| 5,778,483 A * | 7/1998 | Dawson .................... B60S 1/38 |
| | | 15/250.04 |
| 7,111,355 B1 | 9/2006 | Sorensen |
| 8,468,640 B2 | 6/2013 | Chaise et al. |
| 2008/0072392 A1 | 3/2008 | Capoano |
| 2014/0259504 A1* | 9/2014 | Piotrowski ............ B60S 1/4003 |
| | | 15/250.32 |

* cited by examiner

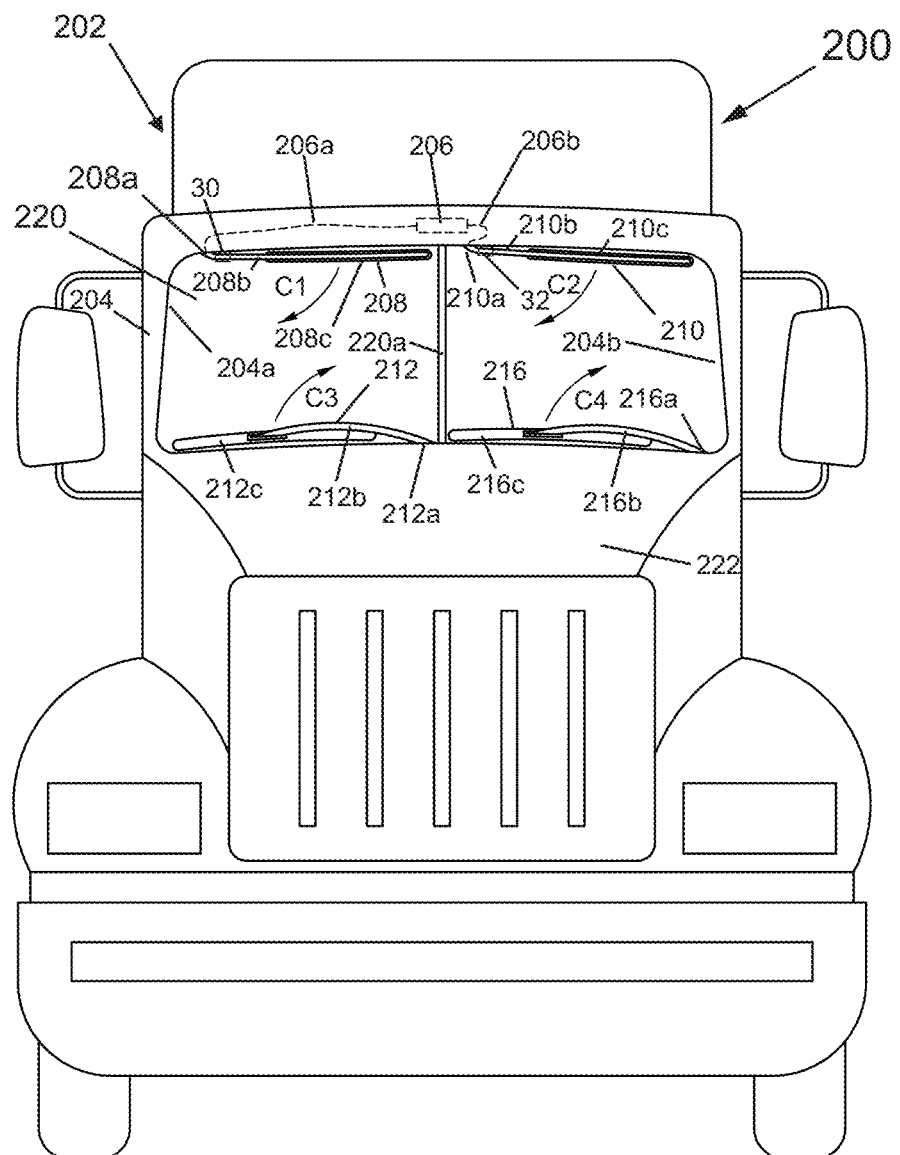

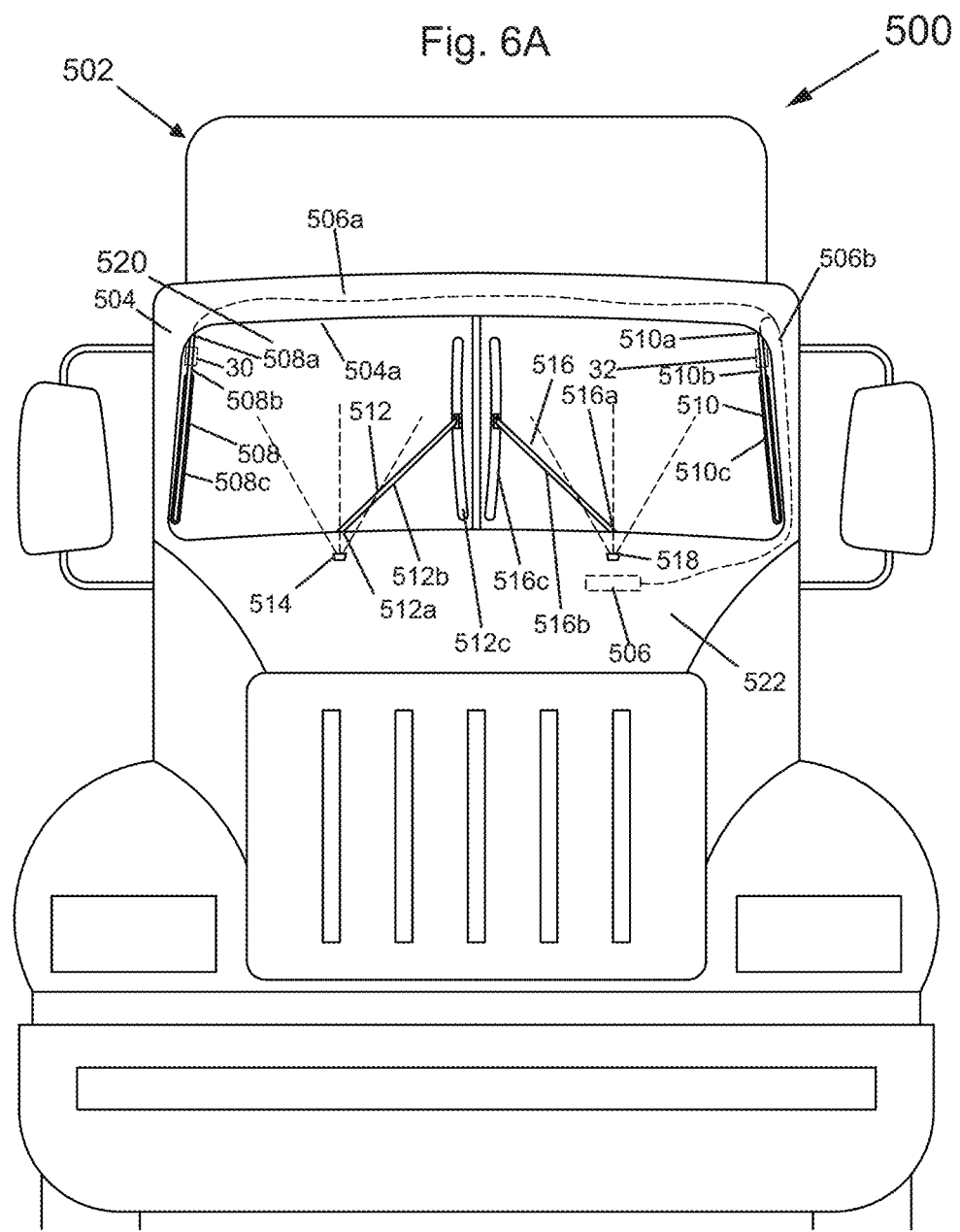

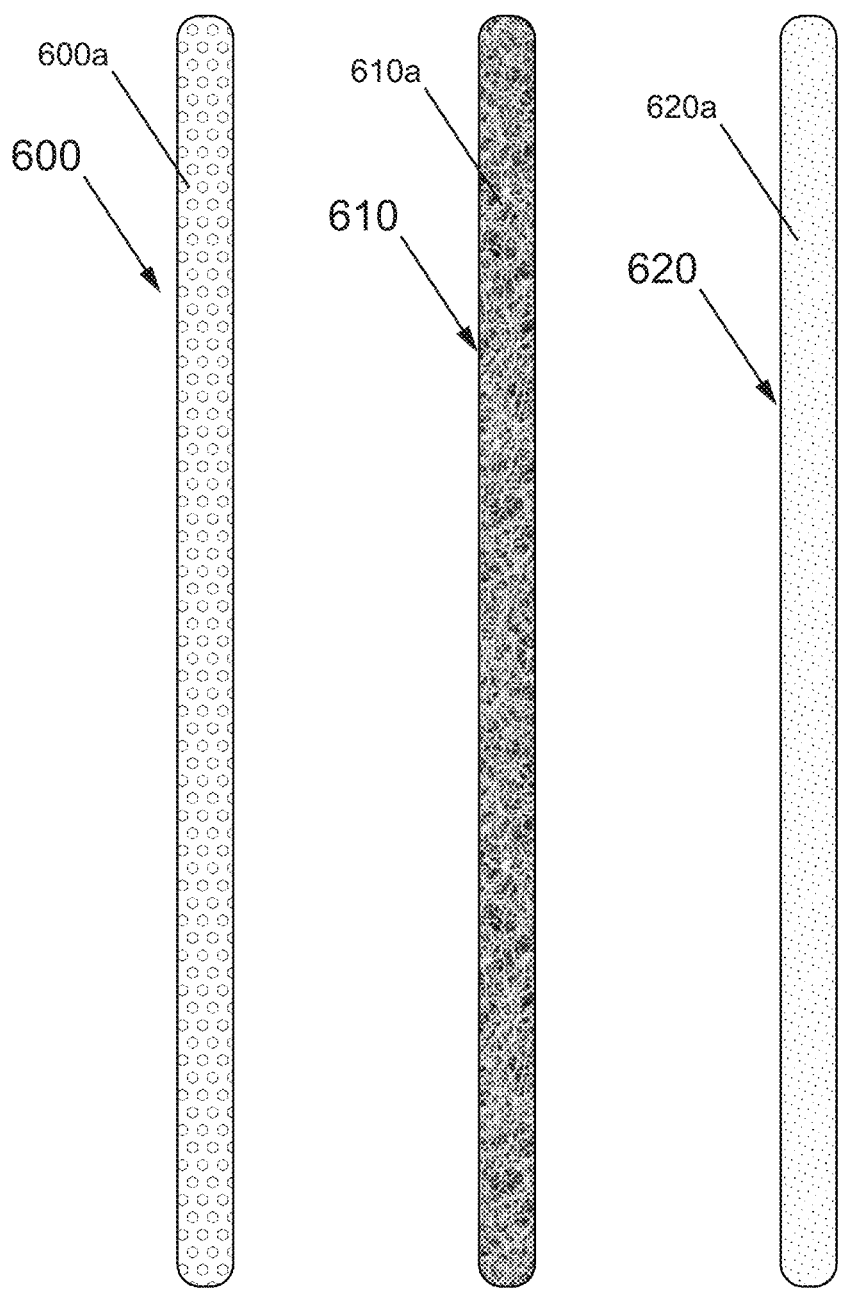

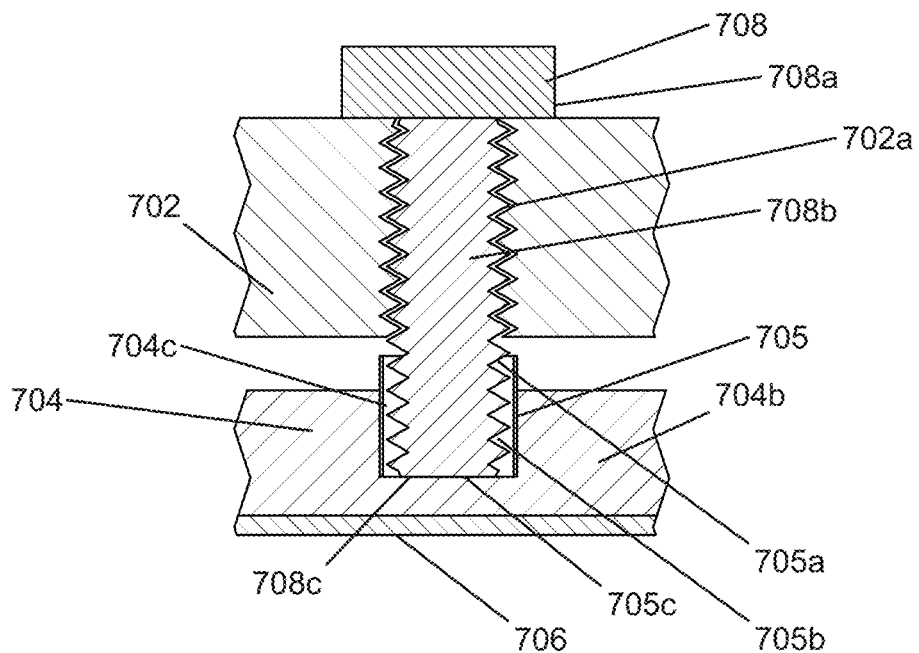
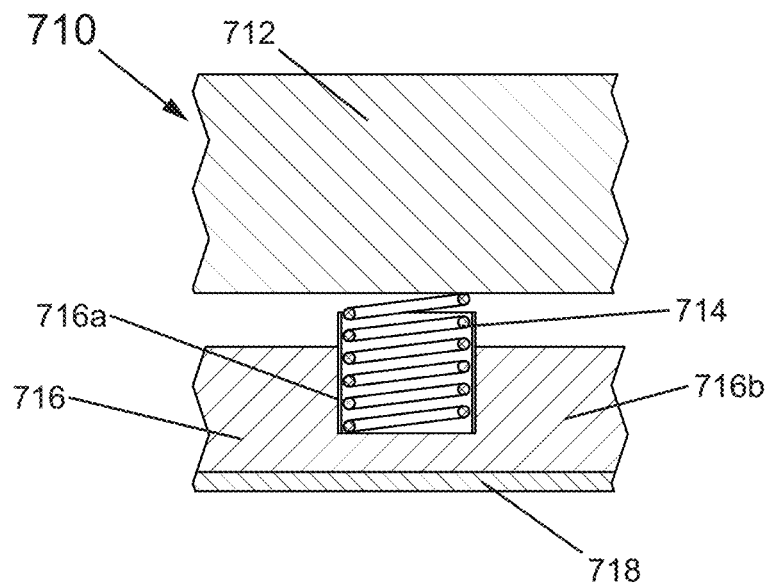

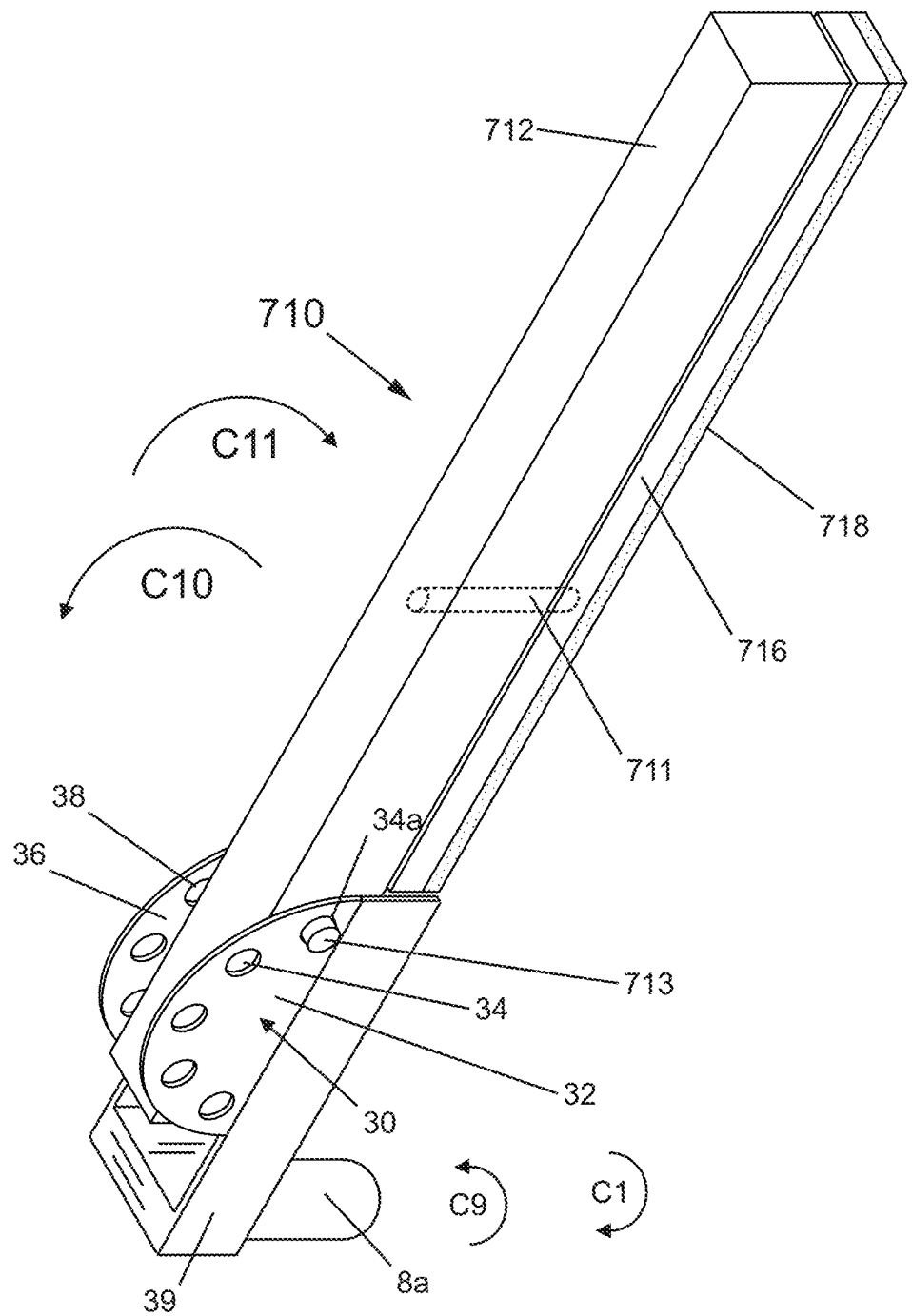

MOTORIZED WINDSHIELD SCOURER

CROSS REFERENCE TO RELATED APPLICATION(S)

The present application claims the priority of U.S. provisional patent application Ser. No. 62/534,878 titled "Motorized Windshield Scouring" filed on Jul. 20, 2017, inventor and applicant Vincent J. LoSacco.

FIELD OF INVENTION

The present invention relates to the dislodging and removing of vision impairing foreign matter from the windshields of motor vehicles and or motor crafts. In particular, the present invention relates to the dislodging and removing of vision impairing foreign matter that accumulates on the windshields of motor vehicles/crafts that the standard windshield wiper system is incapable of removing.

BACKGROUND OF THE INVENTION

The primary function of the windshield wiper system of a motor vehicle is to remove weather elements such as rain and snow from the windshield, to improve vision for the motorist while driving in inclement weather.

An evolution of the windshield wiper system was the adding of a reservoir of windshield washer fluid and a motorized pump that ejects the washer fluid from the reservoir onto the windshield. Giving the windshield wiper system a windshield cleaning function.

However, in spite of the now standard windshield washer fluid reservoir and motorized pump. That system working together with the windshield wipers, has proven to be incapable of removing splatted on vision impairing foreign matter from the windshields of motor vehicles.

Consequently, to remove insect residue and the like from their windshields, motorists are forced to exit their motor vehicle and use a manual hand-held scourer/squeegee implement that has a coarse/textured mesh wrapped around foam on one side, and a squeegee on the other, attached to a handle.

SUMMARY OF THE INVENTION

In one or more embodiments, the present invention provides the 21st century motorized progression of the hand held manual scouring/squeegeeing tool that is currently being used by motorists to remove splatted on and or stuck on vision impairing foreign matter from the windshields of their motor vehicles.

The present invention, in at least one embodiment, provides a motor-powered windshield scourer for any type of a motor-powered vehicle and or motor craft:

The motorized windshield scourer has motor propelled appendages or a singular appendage that have replaceable scouring attachments joined to the appendages. The motor that propels the appendages can be positioned anywhere on or in the motor vehicle/craft, whether under the hood, in the cabin or elsewhere. The motor driven appendages with joined scouring attachments are mounted and stowed on the windshield of the motor vehicle/craft directly opposite of the windshield wiper blades, or elsewhere. When turned on, the motor moves the appendages with joined attachments in a side to side and or up and down motion across the windshield, or any direction/motion effective for scouring.

The appendages and replaceable scouring attachments can be made of any kind and or combination of materials. However, the material that the appendages are made of will be a type and or combination of unpliable metal(s) such as: Steel, Titanium, Tungsten, or Inconel. And the portion of attachments that scourers the windshield will be any type of material that is rough enough to effectively scour the windshield without leaving it scratched or damaged, such as: nylon scouring pads or a vinyl coated mesh attached to and covering rubber or foam.

The power-driven appendages and joined scouring attachments, in at least one embodiment, are equal (or nearly equal) in length and similar in width, and these dimensions in one or more embodiment are critical. So that a means can be implemented to exert pressure from the appendages to the scouring attachments, forcing the scouring attachments to be pressured/pressed hard against the windshield. Thus, making the attachments motorized scourers; Scour: "to rub hard especially with a rough material for cleansing" (Webster's).

In order to exert and maintain maximum pressure from the appendages to the scouring attachments so that the scoring attachments stay pressed hard against the windshield; the appendages will have a lock down mechanism, in at least one embodiment. Accordingly, when pressure is exerted and increased from the appendages to the attachments, the locked down unpliable appendages will not back off or bend. Thus, sustaining the necessary pressure for the attachments to effectively scour the windshield, as opposed to just wiping any implement across the surface of the windshield.

The motorized scourer will operate autonomously in at least one embodiment, nevertheless one skilled in the art can design it to run in sync with any windshield wiping system and or off the same motor as the windshield wipers.

The motorized windshield scourer has its own or shares a reservoir of windshield washer fluid with that of the windshield wiper system; and either has its own motorized pump or will rely on the windshield wiper system pump to eject the windshield washer fluid onto the windshield.

After the windshield washer fluid has been excreted onto the windshield via a motorized pump, the motorized windshield scourer will be turned on to scour the windshield of splatted on vision impairing foreign matter such as insect residue and the like.

Once the motorized windshield scourer has liberated the stuck-on vision impairing foreign matter from the windshield, the known windshield wipers will be activated to squeegee off the liberated foreign matter and dirty cleaning fluid. Thus, the motorized scourer working in conjunction with the windshield wiper system will be performing the same function as the hand held manual windshield scourer/squeegee currently being used by motorists today.

In at least one embodiment, an apparatus is provided comprising a first windshield scouring device; wherein the first windshield scouring device includes a first appendage; a first scouring attachment; a first means for exerting a varying an amount of pressure on the first scouring attachment when the first scouring attachment is pressing against a windshield; and wherein the first appendage is configured to cause rotation of the first scouring attachment in response to a motor, when the first scouring attachment is pressed against the windshield.

The first means may include one or more threaded fasteners; wherein rotating the one or more threaded fasteners of the first means causes the pressure exerted on the first scouring attachment to be varied.

The apparatus may further include a second windshield scouring device; wherein the second windshield scouring device includes a second appendage; a second scouring attachment; a second means for exerting a varying an amount of pressure on the second scouring attachment when the second scouring attachment is pressing against a windshield; and wherein the second appendage is configured to cause rotation of the second scouring attachment in response to a motor, when the second scouring attachment is pressed against the windshield.

The second means may include one or more threaded fasteners; wherein rotating the one or more threaded fasteners of the second means causes the pressure exerted on the second scouring attachment to be varied;

The apparatus may further include a first locking mechanism which prevents the first appendage from lifting when pressure is applied from the first appendage or from for example screws connected to the first appendage, to the first scouring attachment. The apparatus may further include a second locking mechanism which prevents the second appendage from lifting when pressure is applied from the second appendage or from for example screws connected to the second appendage, to the second scouring attachment.

The second scouring attachment may include a flexible backing, a nylon material attached to the flexible backing of the second scouring attachment; and a foam material covered by the nylon material.

The apparatus may be further comprised of a first windshield wiper device; and wherein the first windshield wiper device and the first scouring device are controlled to operate in sequence to clean substantially the same first half of the windshield. The apparatus may further include a second windshield wiper device; and wherein the second windshield wiper device and the second scouring device are controlled to operate in sequence to clean substantially the same second half of the windshield which is different from the first half.

In at least one embodiment a method is provided which may include applying a varying amount of pressure to a first scouring attachment and/or a second scouring attachment when the first and/or second scouring attachment is pressed against a vehicle windshield; with the apparatus in one of the forms previously described.

BRIEF DESCRIPTION OF THE DRAWINGS

FIG. 3A shows a front view of another apparatus in accordance with an embodiment of the present invention;

FIG. 6A shows a front view of another apparatus in accordance with an embodiment of the present invention;

FIGS. 7A-C show top views of scour pads for use with one or more of the apparatus of FIGS. 1A-6A;

FIG. 9A shows a cross sectional view of part of a member attached to a scouring attachment;

FIG. 9B shows a cross section view of part of another member attached to a scouring attachment;

FIG. 11B shows a top and right perspective view of the apparatus of FIG. 10B attached to a locking mechanism which is attached to a pivot member.

DETAILED DESCRIPTION OF THE DRAWINGS

Figure 1A:
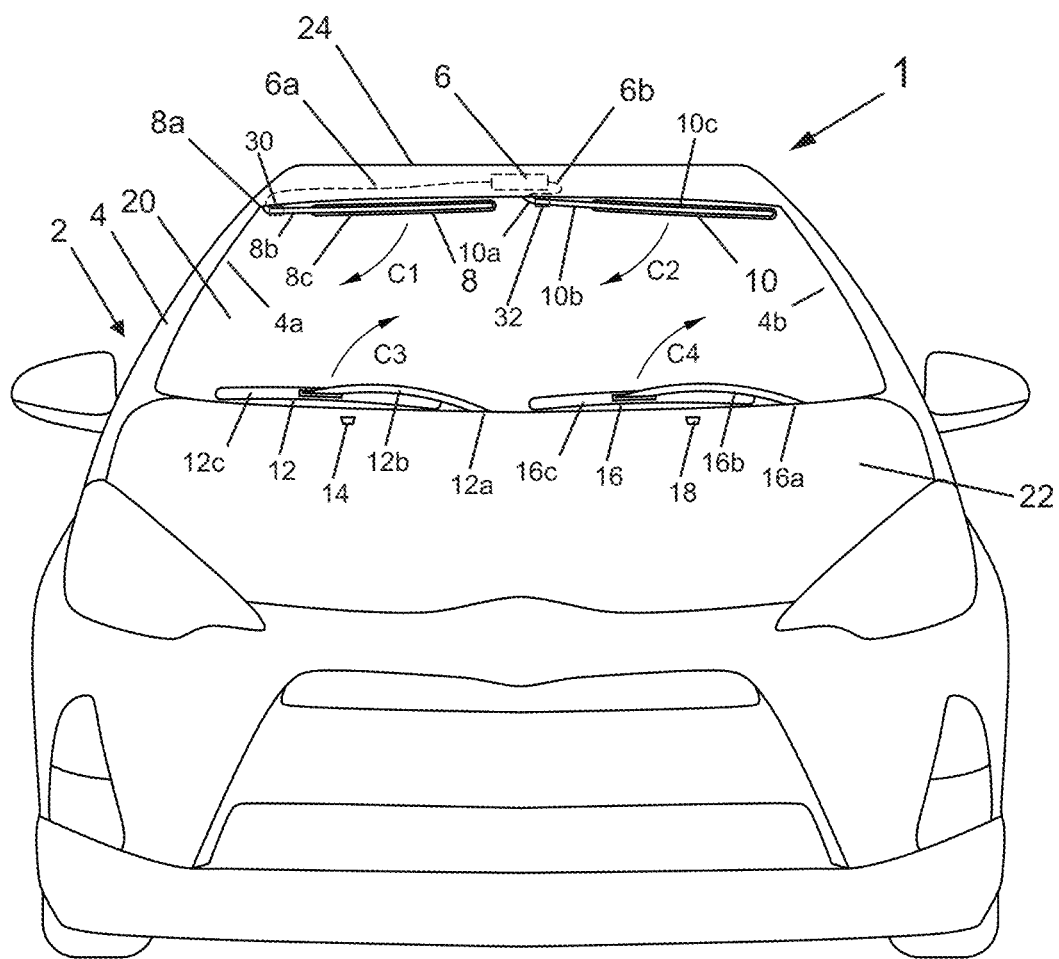
FIG. 1A shows a front view of an apparatus in accordance with an embodiment of the present invention.

FIG. 1A shows a front view of an apparatus 1 in accordance with an embodiment of the present invention. The apparatus 1 includes a car or automobile 2 and various other components. The car 2 includes a frame or body 4, a windshield 20, and a hood 22. The apparatus 1 also includes components shown in block diagram form in FIG. 1B, some of which may be inside of the car 2, and/or not visible from the view of FIG. 1A.

Figure 11A:
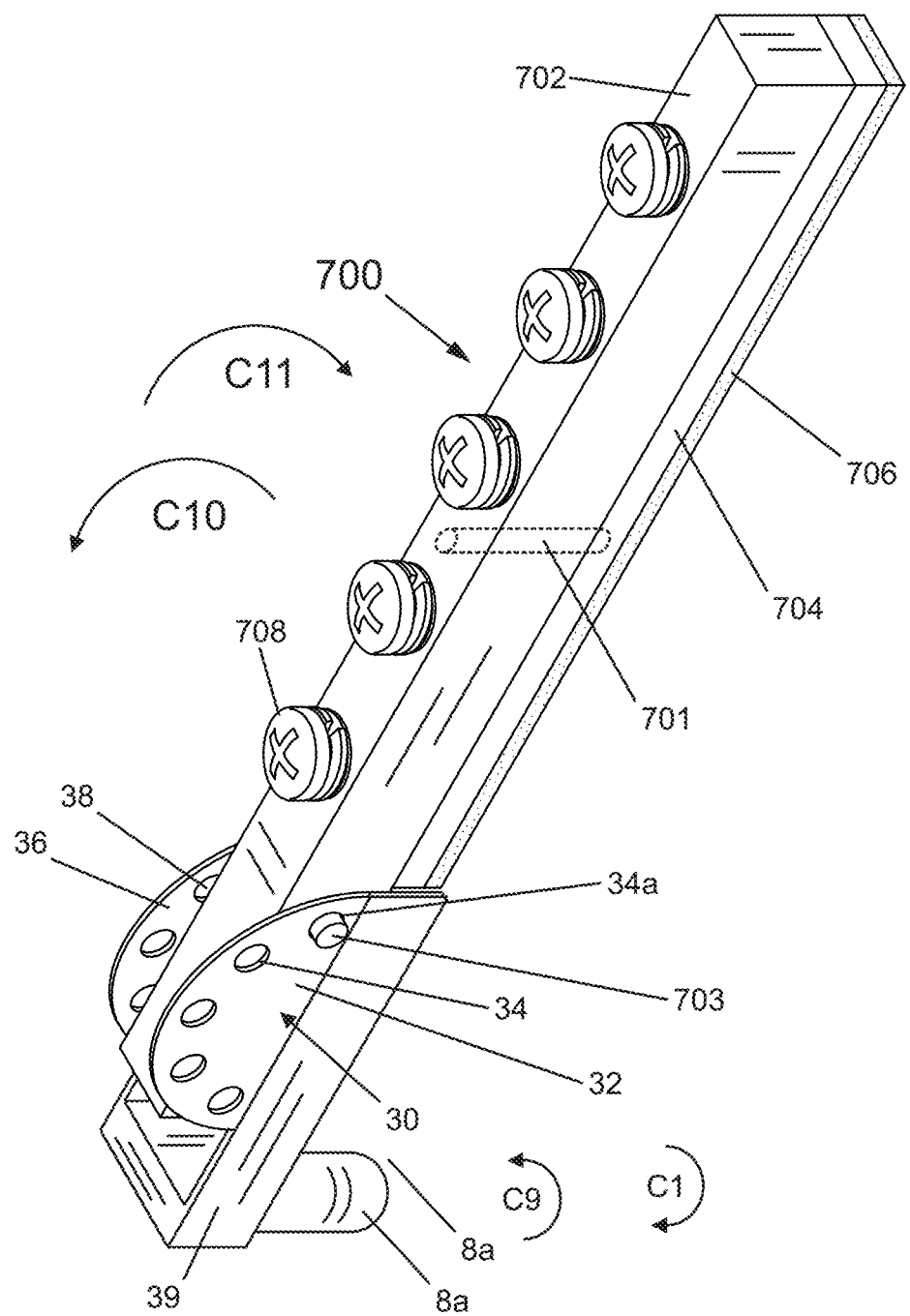
FIG. 11A shows a top and right perspective view of the apparatus of FIG. 10A attached to a locking mechanism which is attached to a pivot member.

The apparatus 1 also includes an auxiliary motor 6 and a scouring control device 7. The apparatus 1 includes scouring devices 8 and 10. The scouring devices include components 8a-c and 10a-c, respectively. The scouring control device 7 is electrically connected to the auxiliary motor 6 which is electronically connected to scouring devices 8 and 10. The scouring devices 8 and 10, include appendages 8b and 10b, and pivot points 8a and 10a where appendage lock down mechanisms 30 and 32, respectively are located. Lock down mechanisms 30 and 32 may be similar or identical, and mechanism 30 is shown in FIGS. 11A-11B. Pivot points or members 8a and 10a are pivot points to the frame 4 so that the appendages 8b and 10b can rotate in the clockwise directions C1 and C2, respectively. The appendages 8b and 10b connect and exert pressure to scouring attachments 8c and 10c which are removably attached to appendages 8b and 10b forcing scouring attachments 8c and 10c to be pressed hard against windshield 20. Scouring attachments 8c and 10c scourer and or scrubs the windshield 20 of the automobile 2 by rotating in the directions C1 and C2, respectively from the position in FIG. 1A, until appendages 8b and 10b are in a vertically straight position and then rotate back counterclockwise to the position shown in FIG. 1A. The starting and rotation and ceasing of the rotation of appendages 8b and 10b are controlled by the control device 7, shown in block diagram form in FIG. 1B and auxiliary motor 6 which may include a transmission, computer processor, computer memory, and computer software stored in computer memory for controlling the rotation of appendages 8b and 10b.

The apparatus 1 also includes windshield wiper devices 12 and 16. The windshield wiper devices 12 and 16 may include members 12b and 16b, wiper blades 12c and 16c, may rotate on pivot points or members 12a and 16a, respectively, and may run off the same auxiliary motor 6 or may run off of a different motor.

In at least one embodiment, the control device 7 may control scouring devices 8 and 10 and windshield wiper devices 12 and 16, with settings that prevent scouring device 8 and 10 from colliding with the windshield wipers devices 12 and 16. However, in the most common application control device 7 will operate scouring devices 8 and 10 solely, and the standard windshield wiper control will operate wiper devices 12 and 16. In at least one embodiment, the control device 6 may cause the scouring devices 8 and 10 and windshield wiper devices 12 and 16 to operate in sequence. For example, scouring devices 8 and 10 may operate first, by rotating from the state of FIG. 1A, and then rotate back to the state of FIG. 1A, while the windshield devices 12 and 18 are stationary. Thereafter, with scouring devices 8 and 10 stationary, the control device 7 may cause the windshield wiper devices 12 and 18 to rotate from the state of FIG. 1A, and then back to the state of FIG. 1A. The sequence may continue with the operation of scouring devices 8 and 10 and the operation of windshield devices 12 and 18 simultaneously alternating positions.

Figure 1B:
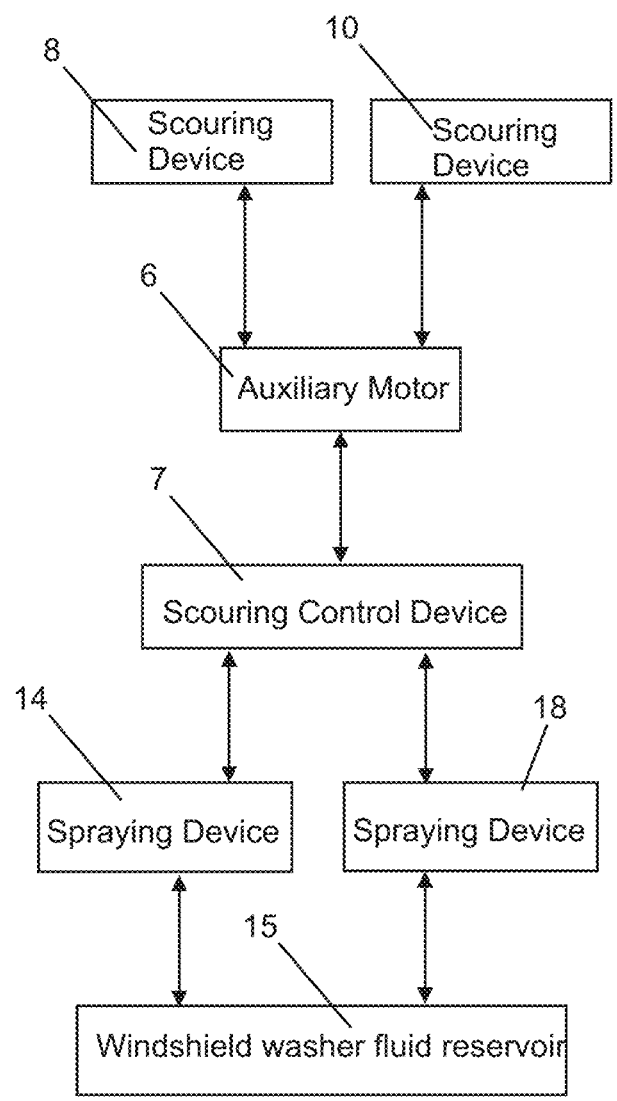
FIG. 1B shows a block diagram of components for use with the apparatus of FIG. 1A.

The apparatus 1 also includes a windshield washer fluid reservoir 15 and spraying devices 14 and 18, which may be controlled by control device 7, as shown by the block diagram of FIG. 1B.

Figure 2A:
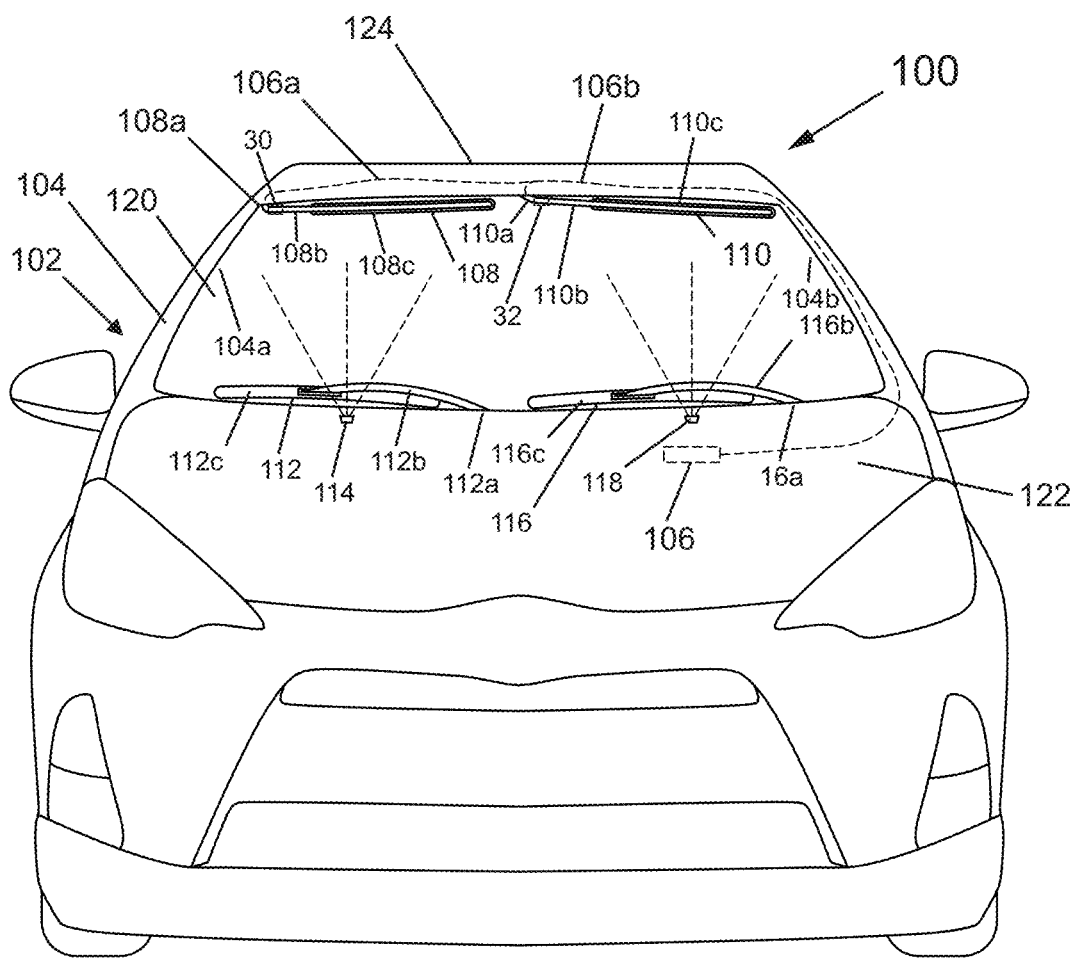
FIG. 2A shows a front view of another apparatus in accordance with an embodiment of the present invention.

FIG. 2A shows a front view of an apparatus 100 in accordance with an embodiment of the present invention. The apparatus 100 includes a car or automobile 102 and various other components. The car 102 includes a frame or body 104, a windshield 120, and a hood 122.

Figure 2B:
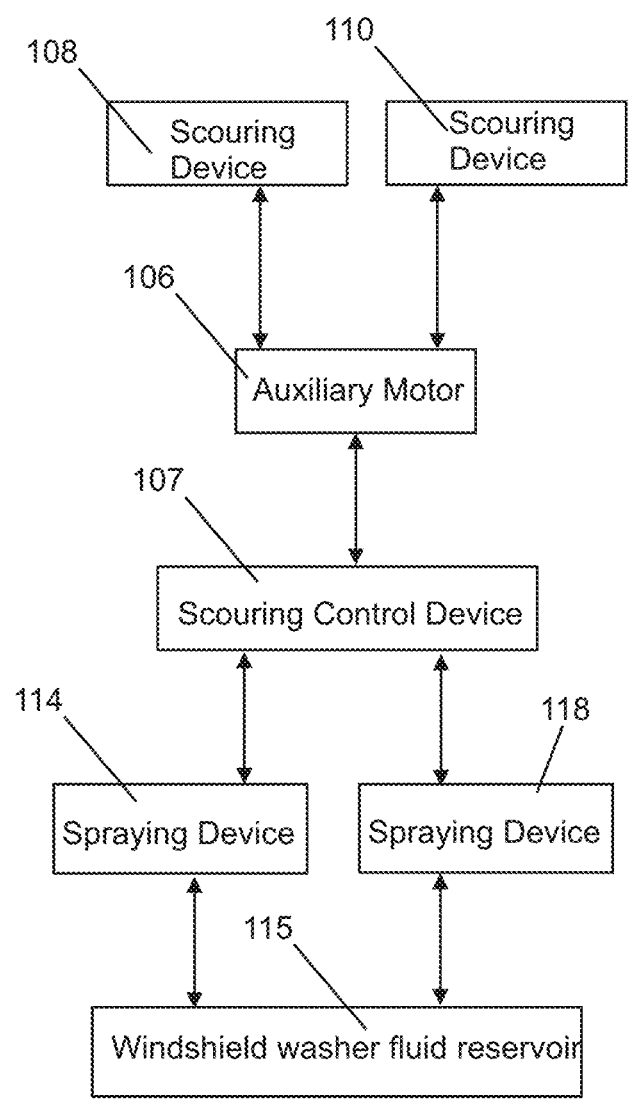
FIG. 2B shows a block diagram of components for use with the apparatus of FIG. 2A.

The apparatus 100 also includes an auxiliary motor 106 under the hood 122 and control device 107, shown in block diagram form in FIG. 2B. The scouring control device 107 is electrically connected to the auxiliary motor 106 which is electronically connected to the scouring device 108 and 110. The scouring devices 108 and 110 include appendages 108b and 110b, which include pivot points 108a and 110a, where appendage lock down mechanisms 30 and 32, respectively are located. Lock down mechanisms 30 and 32 may be similar or identical, and are also shown in FIGS. 1A, 2A, 3A, 4A, 5A, and 6A. Lock down mechanism 30 is shown in detail in FIGS. 11A and 11B. Pivot points 108a and 110a are pivot points to the frame 104 so that the appendages 108b and 110b can rotate in the clockwise direction. The appendages 108b and 110b connect and exert pressure to scouring attachments 108c and 110c which are removably attached to appendages 108b and 110b. forcing scouring attachments 108c and 110c to be pressed hard against windshield 120 Scouring attachments 108c and 110c scourer and or scrubs the windshield 120 of the automobile 102 by rotating clockwise from the position in FIG. 2A, until appendages 108b and 110b are in a vertically straight position and then rotate back counterclockwise to the position shown in FIG. 2. The starting and rotation and ceasing of the rotation of appendages 108b and 110b are controlled by the control device 107 (not shown in drawings) and auxiliary motor 106 which may include a transmission, computer processor, computer memory, and computer software stored in computer memory for controlling the scouring devices 108 and 110 and the rotation of appendages 108b and 110b.

The apparatus 100 also includes windshield wiper devices 112 and 116. The windshield wiper devices 112 and 116 may include members 112b and 116b, wiper blades 112c and 116c, may rotate on pivot points or members 112a and 116a, respectively, and my run off the same auxiliary motor 106 that powers the scouring devices 108 and 110.

In at least one embodiment, the control device 107 may control scouring devices 108 and 110 and windshield wiper devices 112 and 116, with settings that prevent scouring device 108 and 110 from colliding with the windshield wipers devices 112 and 116. However, in the most common application control device 107 will operate scouring devices 108 and 110 solely, and the standard windshield wiper control will operate wiper devices 112 and 116. In at least one embodiment, the control device 107 may cause the scouring devices 108 and 110 and the windshield wiper devices 112 and 116 to operate in sequence. For example, scouring devices 108 and 110 may operate first, by rotating from the state of FIG. 2A, and then rotate back to the state of FIG. 2A, while the windshield devices 112 and 118 are stationary. Thereafter, with scouring devices 108 and 110 stationary, the control device 107 may cause the windshield wiper devices 112 and 118 to rotate from the state of FIG. 2, and then back to the state of FIG. 2. The sequence may continue with the operation of scouring devices 108 and 10 and the operation of windshield devices 112 and 118 simultaneously alternating positions.

The apparatus 100 also includes a windshield washer fluid reservoir 115 and a motor powered spraying devices 114 and 118, which may be controlled by control device 107 shown in FIG. 2B.

FIG. 3A shows a front view of an apparatus 200 in accordance with an embodiment of the present invention. The apparatus 200 includes a truck 202 and various other components. The truck 202 includes a frame or body 204, a windshield 220, and a hood 222.

Figure 3B:
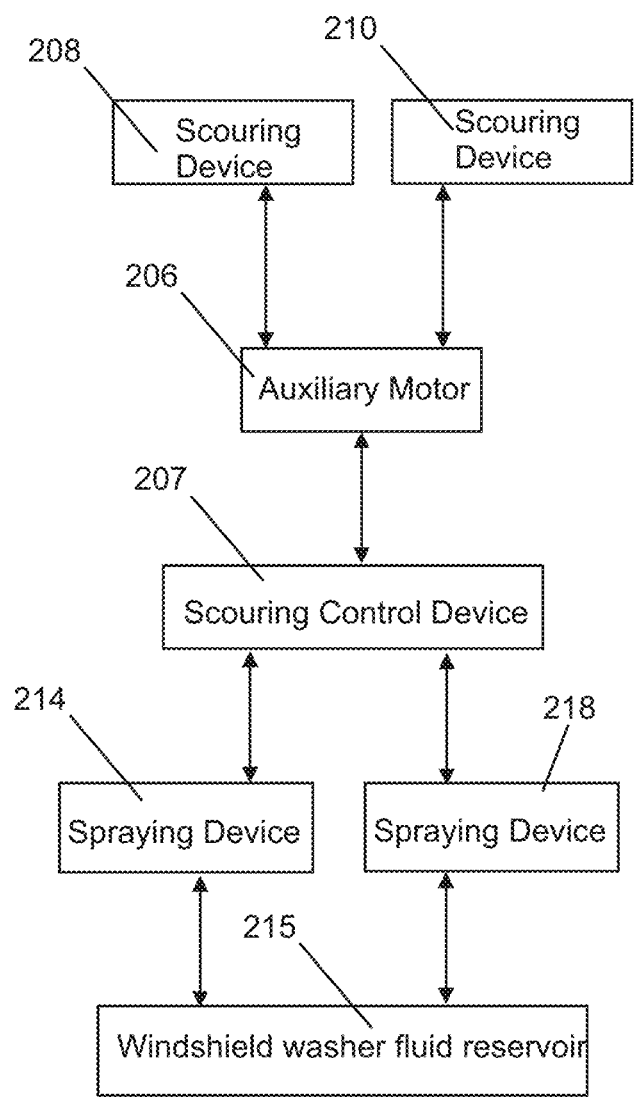
FIG. 3B shows a block diagram of components for use with the apparatus of FIG. 3A.

The apparatus 200 also includes an auxiliary motor 206 and control device 207, shown in block diagram form in FIG. 3B. The scouring control device 207 is electrically connected to the auxiliary motor 206 which is electronically connected to the scouring devices 208 and 210. The scouring devices 208 and 210 may include components 208a-c and 210a-c, respectively. The scouring devices 208 and 210 may include appendages 208b and 210b, which have members 208a and 210a which are pivot points where appendage lock down mechanisms 30 and 32, respectively, are located. Pivot points 208a and 210a are pivot points to the frame 4 so that the appendages 208b and 210b can rotate in the clockwise directions C1 and C2. The appendages 208b and 210b connect and exert pressure to scouring attachments 208c and 210c which are removably attached to appendages 208b and 210b. The appendages 208b and 210b force scouring devices 208c and 210c to be pressed hard against windshield 220. Scouring attachments 208c and 210c scourer and/or scrub the windshield 220 of the truck 200 by rotating in the directions C1 and C2, from the position in FIG. 3A, until appendages 208b and 210b are in the furthest clockwise position the perimeter will allow, then rotate back counterclockwise to the position shown in FIG. 3A. The starting and rotation and ceasing of the rotation of appendages 208b and 210b are controlled by the control device 207, shown in FIG. 3A and auxiliary motor 206 which may include a transmission, computer processor, computer memory, and computer software stored in computer memory for controlling scouring devices 208 and 210, and the rotation of appendages 208b and 210b.

The apparatus 200 also includes windshield wiper devices 212 and 216. The windshield wiper devices 212 and 216 may include members 212b and 216b, wiper blades 212c and 216c, may rotate on pivot points or members 212a and 216a, respectively, and my run off the same auxiliary motor 206.

In at least one embodiment, the control device 207 may control scouring devices 208 and 210 and windshield wiper devices 212 and 216, with settings that prevent scouring device 208 and 210 from colliding with the windshield wipers devices 212 and 216. However, in the most common application control device 207 will operate scouring devices 208 and 120 solely, and the standard windshield wiper control will operate wiper devices 212 and 216. In at least one embodiment, the control device 207 may cause the scouring devices 208 and 210 and the windshield wiper devices 212 and 216 to operate in sequence. For example, scouring devices 208 and 210 may operate first, by rotating from the state of FIG. 3A, and then rotate back to the state of FIG. 3A, while the windshield devices 212 and 218 are stationary. Thereafter, with scouring devices 208 and 210 stationary, the control device 207 may cause the windshield wiper devices 212 and 218 to rotate from the state of FIG. 3, and then back to the state of FIG. 3. The sequence may continue with the operation of scouring devices 208 and 210 and the operation of windshield devices 212 and 218 simultaneously alternating positions.

The apparatus 200 also includes a windshield washer fluid reservoir 215 and spraying devices 214 and 218, which may be controlled by control device 107, shown in FIG. 3B.

Figure 4A:
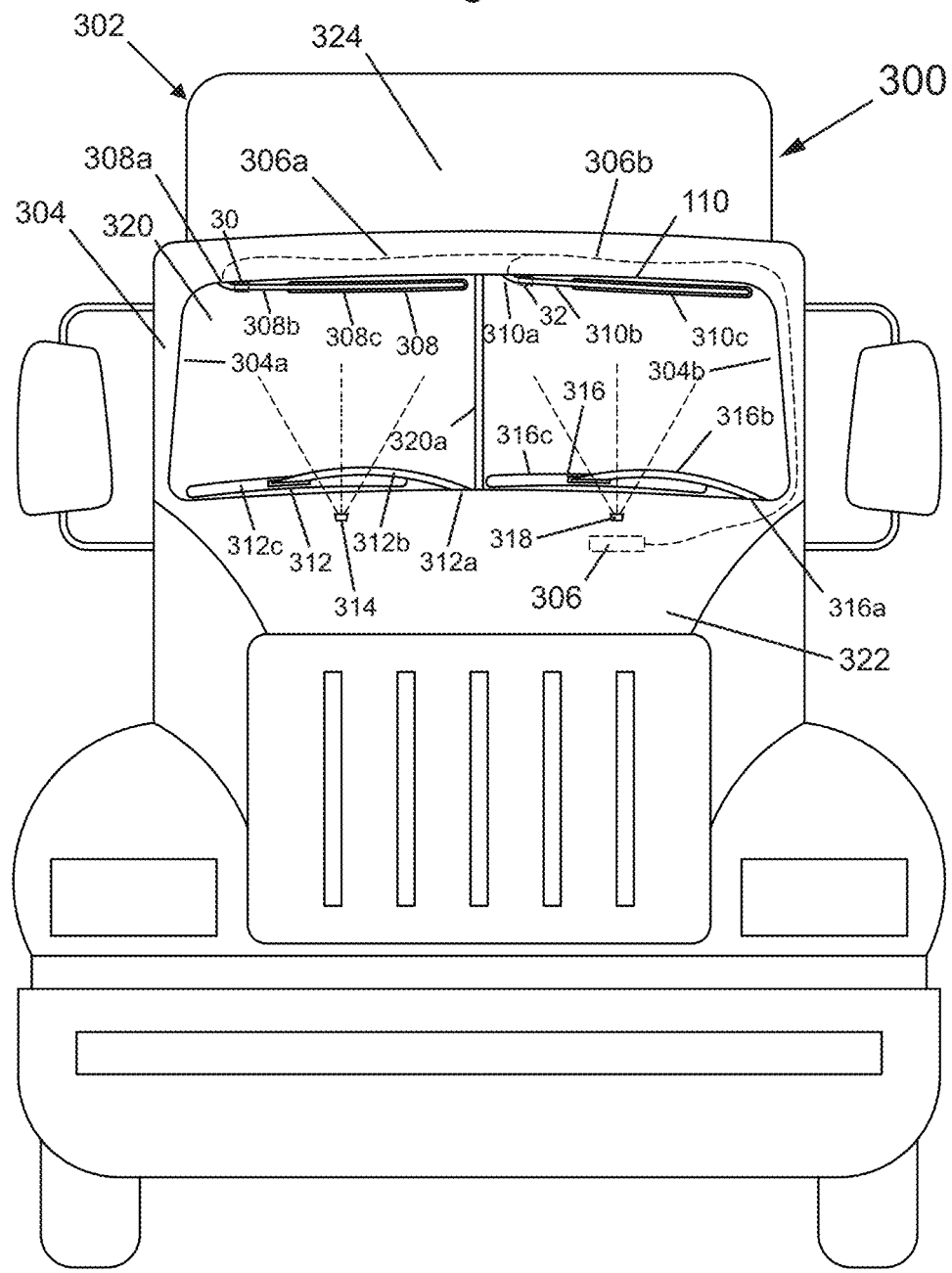
FIG. 4A shows a front view of another apparatus in accordance with an embodiment of the present invention.

FIG. 4A shows a front view of an apparatus 300 in accordance with an embodiment of the present invention. The apparatus 300 includes a truck 302 and various other components. The truck 302 includes a frame or body 304, a windshield 320, and a hood 322.

Figure 4B:
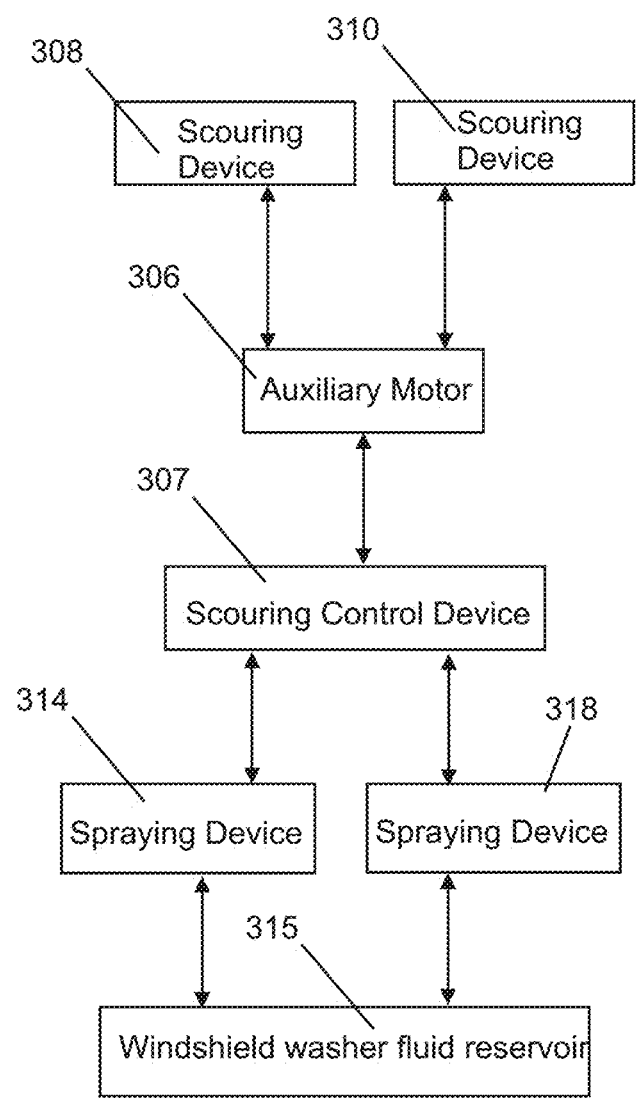
FIG. 4B shows a block diagram of components for use with the apparatus of FIG. 4A.

The apparatus 300 also includes an auxiliary motor 306 under the hood 322 and control device 307 shown in block diagram form in FIG. 4B. The scouring control device 307 is electrically connected to the auxiliary motor 306 which is electronically connected to scouring devices 308 and 310. The scouring devices 308 and 310 include components 308a-c and 310a-c, respectively. The scouring devices 308 and 310 include appendages 308b and 310b, which may include members 308a and 310a which are pivot points where appendage lock down mechanism 30 and 32, respectively, are located. Pivot points or members 308a and 310a are pivot points to the frame 304 so that the appendages 308b and 310b can rotate in the clockwise direction. The appendages 308b and 310b connect and exert pressure to scouring attachments 308c and 310c which are removably attached to appendages 308b and 310b forcing scouring attachments 308c and 310c to be pressed hard against windshield 320. Scouring attachments 308c and 310c scourer and or scrub the windshield 320 of the truck 302 by rotating clockwise from the position in FIG. 4A, until appendages 308b and 310b are in the furthest clockwise position the perimeter will allow, near edge 304a and middle member 320a, respectively, and then rotate back counter-clockwise to the position shown in FIG. 4A. The starting and rotation and ceasing of the rotation of appendages 108b and 110b are controlled by the control device 307 and auxiliary motor 306 which may include a transmission, computer processor, computer memory, and computer software stored in computer memory for controlling the scouring devices 308 and 310, by controlling the rotation of appendages 308b and 310b.

The apparatus 300 also includes windshield wiper devices 312 and 316. The windshield wiper devices 312 and 316 may include members 312b and 316b, wiper blades 312c and 316c, may rotate on pivot points or members 312a and 316a, respectively, and my run off the same auxiliary motor that powers the scouring equipment.

In at least one embodiment, the control device 307 may control scouring devices 308 and 310 and windshield wiper devices 312 and 316, with settings that prevent scouring device 308 and 310 from colliding with the windshield wipers devices 312 and 316. However, in the most common application control device 307 will operate scouring devices 308 and 310 solely, and the standard windshield wiper control will operate wiper devices 312 and 316. In at least one embodiment, the control device 307 may cause the scouring devices 308 and 310 and the windshield wiper devices 312 and 316 to operate in sequence. For example, scouring devices 308 and 310 may operate first, by rotating from the state of FIG. 4A, and then rotate back to the state of FIG. 4A, while the windshield devices 312 and 318 are stationary. Thereafter, with scouring devices 308 and 310 stationary, the control device 307 may cause the windshield wiper devices 312 and 316 to rotate from the state of FIG. 4A, and then back to the state of FIG. 4A. The sequence may continue with the operation of scouring devices 308 and 310 and the operation of windshield devices 312 and 316 simultaneously alternating positions.

The apparatus 300 also includes a windshield washer fluid reservoir 315, shown in FIG. 4B and a motor powered spraying devices 314 and 318, which may be controlled by control device 307.

Figure 5A:
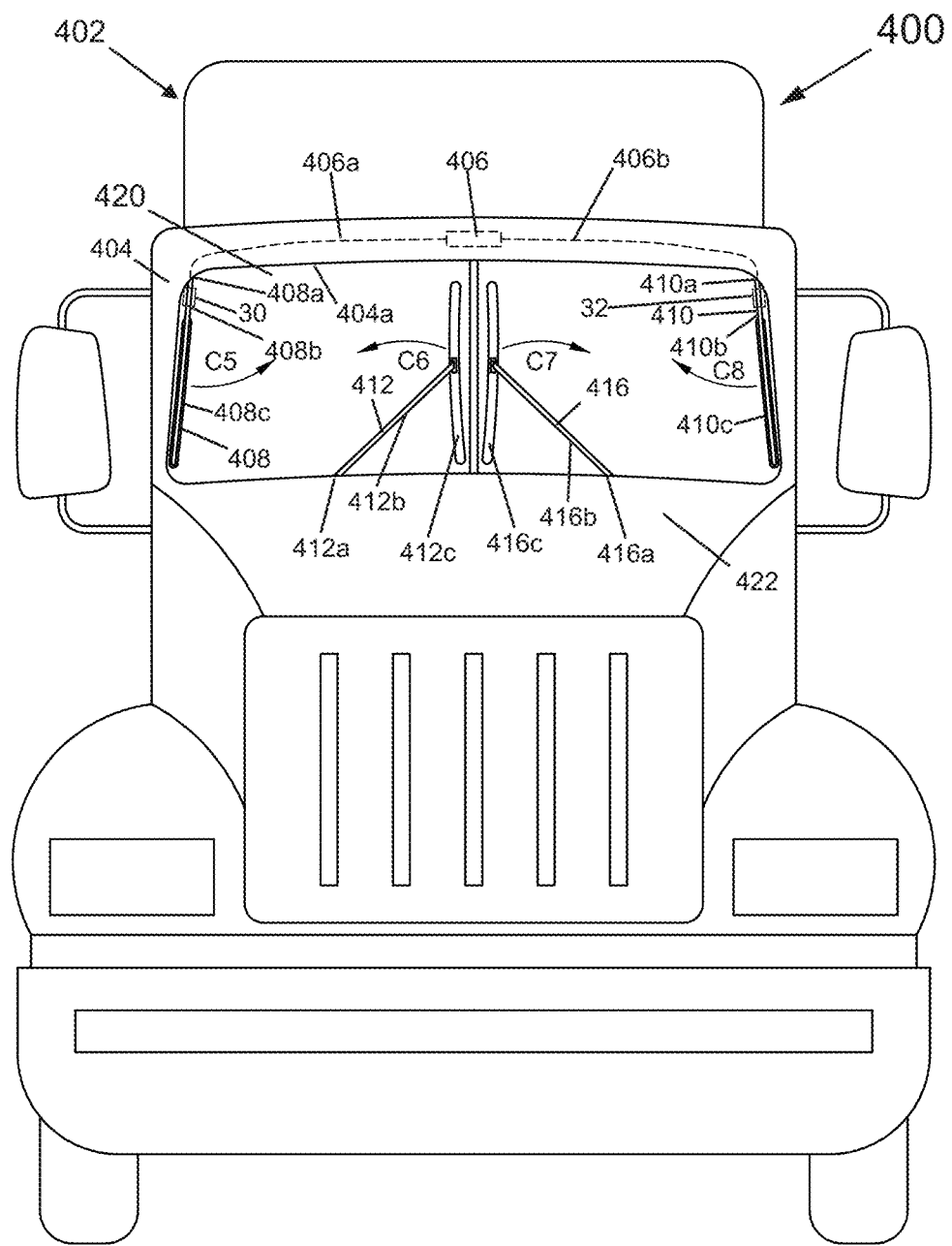
FIG. 5A shows a front view of another apparatus in accordance with an embodiment of the present invention.

FIG. 5A shows a front view of an apparatus 400 in accordance with an embodiment of the present invention. The apparatus 400 includes a truck 402 and various other components. The truck 402 includes a frame or body 404, a windshield 420, and a hood 422.

Figure 5B:
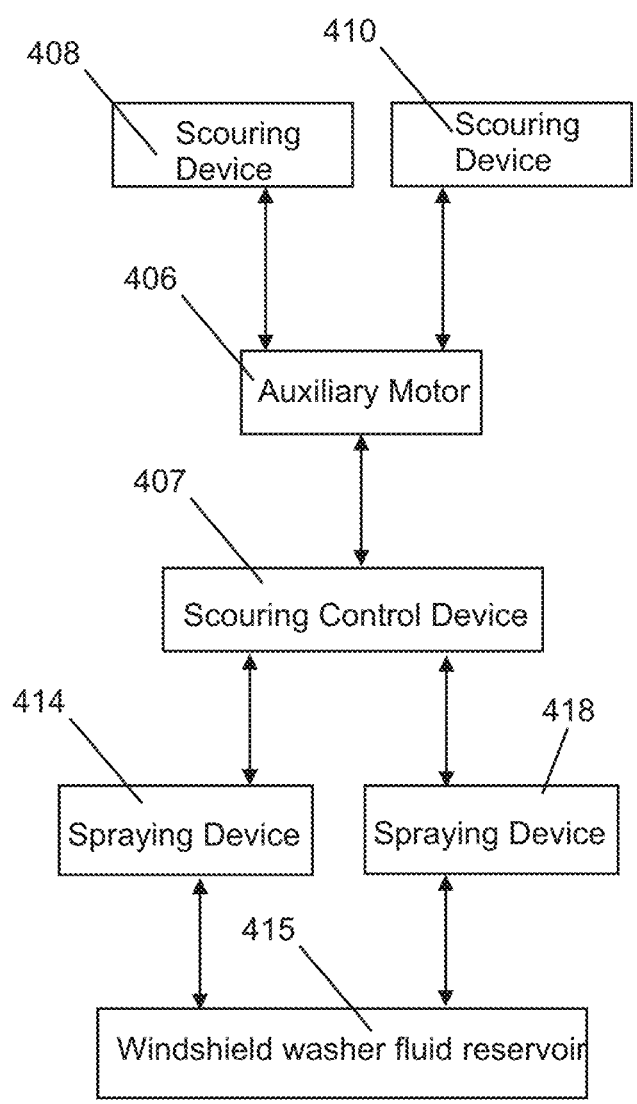
FIG. 5B shows a block diagram of components for use with the apparatus of FIG. 5A.

The apparatus 400 also includes an auxiliary motor 406 and control device 407 shown in block diagram form in FIG. 5B. The scouring control device 407 is electrically connected to the auxiliary motor 406 which is electronically connected to scouring devices 408 and 410. The scouring devices 408 and 410 include components 408a-c and 410a-c, respectively. The scouring devices 408 and 410 include appendages 408b and 410b, which may include members 408a and 410a which are pivot points where appendage lock down mechanisms 30 and 32, respectively, are located. Pivot points or members 408a and 410a are pivot points to the frame 404 so that the appendages 408b and 410b, respectively, can rotate upward toward the center of windshield 420. The appendages 408b and 410b connect and exert pressure to scouring attachments 408c and 410c which are removably attached to appendages 408b and 410b, forcing scouring attachments 408c and 410c to be pressed hard against windshield 420. Scouring attachments 408c and 410c scourer and or scrubs the windshield 420 of the truck 400 by rotating upward toward the center of windshield 420 from the position in FIG. 5A, until appendages 408b and 410b are to the top of windshield 420, near edge 404a, then rotate back to the position shown in FIG. 5A. The starting and rotation and ceasing of the rotation of appendages 408b and 410b are controlled by the control device 407, shown in block diagram form in FIG. 5B and auxiliary motor 406 which may include a transmission, computer processor, computer memory, and computer software stored in computer memory for controlling the scouring devices 408 and 410 by controlling the rotation of appendages 408b and 410b, respectively.

The apparatus 400 also includes windshield wiper devices 412 and 416. The windshield wiper devices 412 and 416 may include members 412b and 416b, wiper blades 412c and 416c, may rotate on pivot points or members 412a and 416a, respectively, and my run off the same auxiliary motor 406.

In at least one embodiment, the control device 407 may control scouring devices 408 and 410 and windshield wiper devices 412 and 416, with settings that prevent scouring device 408 and 410 from colliding with the windshield wipers devices 412 and 416. However, in the most common application control device 407 will operate scouring devices 408 and 420 solely, and the standard windshield wiper control will operate wiper devices 412 and 416. In at least one embodiment, the control device 407 may cause the scouring devices 408 and 410 and the windshield wiper devices 412 and 416 to operate in sequence. For example, scouring devices 408 and 410 may operate first, by rotating from the state of FIG. 5A, and then rotate back to the state of FIG. 5A, while the windshield devices 412 and 418 are stationary. Thereafter, with scouring devices 408 and 410 stationary, the control device 407 may cause the windshield wiper devices 412 and 408 to rotate from the state of FIG. 5A, and then back to the state of FIG. 5A. The sequence may continue with the operation of scouring devices 408 and 410 and the operation of windshield devices 412 and 418 simultaneously alternating positions.

The apparatus 400 also includes a windshield washer fluid reservoir 415 and a motor powered spraying devices 414 and 418, which may be controlled by control device 407 shown in block diagram form in FIG. 5B.

FIG. 6A shows a front view of an apparatus 500 in accordance with an embodiment of the present invention. The apparatus 500 includes a truck 502 and various other components. The truck 502 includes a frame or body 504, a windshield 520, and a hood 522.

Figure 6B:
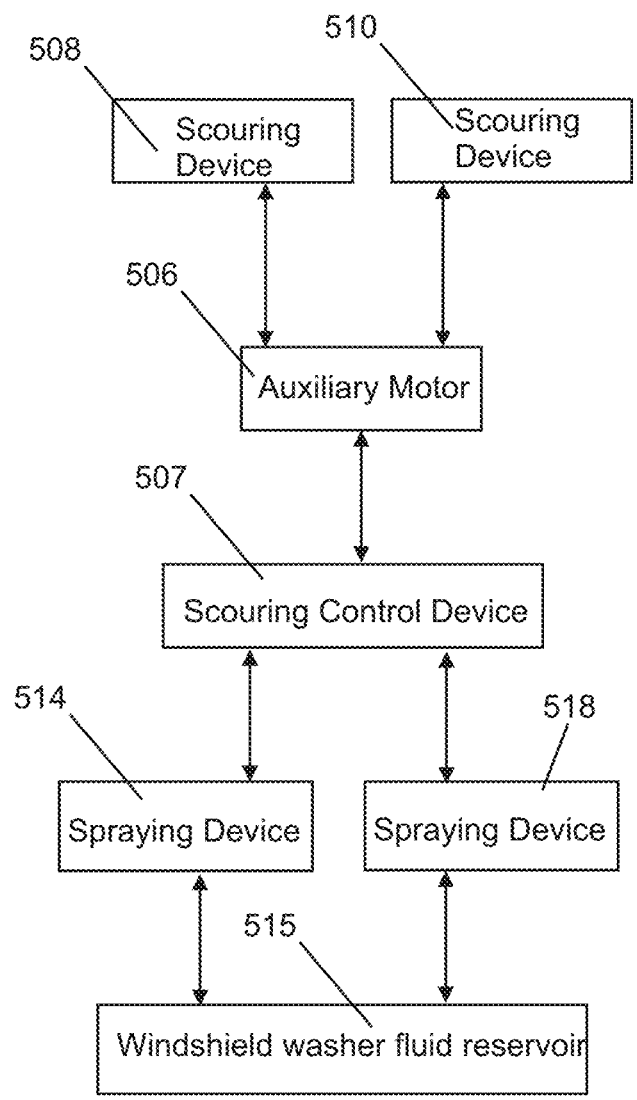
FIG. 6B shows a block diagram of components for use with the apparatus of FIG. 6A.

The apparatus 500 also includes an auxiliary motor 506 and control device 507 shown in block diagram form in FIG. 6B. The scouring control device 507 is electrically connected to the auxiliary motor 506 which is electronically connected to the scouring devices 508 and 510. The scouring devices 508 and 510 include components 508a-c and 510a-c, respectively. The scouring devices 508 include appendages 508b and 510b, which may include members 508a and 510a which are pivot points where appendage lock down mechanisms 30 and 32, respectively, are located. Pivot points 508a and 510a are pivot points to the frame 504 so that the appendages 508b and 510b, respectively, can rotate upward toward the center of windshield 520. The appendages 508b and 510b connect and exert pressure to scouring attachments 508c and 510c which are removably attached to appendages 508b and 510b, forcing scouring attachments 508c and 510c to be pressed hard against windshield 520. Scouring attachments 508c and 510c scourer and or scrubs the windshield 520 of the truck 500 by rotating upward toward the center of windshield 520 from the position in FIG. 6A, until appendages 508b and 510b are to the top of windshield 520, then rotate back to the position shown in FIG. 6A. The starting and rotation and ceasing of the rotation of appendages 508b and 510b are controlled by the control device 507 and auxiliary motor 506, which may include a transmission, computer processor, computer memory, and computer software stored in computer memory for controlling the scouring devices 508 and 510, by controlling the rotation of appendages 508b and 510b.

The apparatus 500 also includes windshield wiper devices 512 and 516. The windshield wiper devices 512 and 516 may include members 512b and 516b, wiper blades 512c and 516c, may rotate on pivot points or members 512a and 516a, respectively, and my run off the same auxiliary motor 506.

In at least one embodiment, the control device 507 may control scouring devices 508 and 510 and windshield wiper devices 512 and 516, with settings that prevent scouring device 508 and 510 from colliding with the windshield wipers devices 512 and 516. However, in the most common application control device 507 will operate scouring devices 508 and 520 solely, and the standard windshield wiper control will operate wiper devices 512 and 516. In at least one embodiment, the control device 507 may cause the scouring devices 508 and 510 and the windshield wiper devices 512 and 516 to operate in sequence. For example, scouring devices 508 and 510 may operate first, by rotating from the state of FIG. 6A, and then rotate back to the state of FIG. 6A, while the windshield devices 512 and 518 are stationary. Thereafter, with scouring devices 508 and 510 stationary, the control device 507 may cause the windshield wiper devices 512 and 508 to rotate from the state of FIG. 6A, and then back to the state of FIG. 6A. The sequence may continue with the operation of scouring devices 508 and 510 and the operation of windshield devices 512 and 516 simultaneously alternating positions.

The apparatus 500 also includes a windshield washer fluid reservoir 515 and a motor powered spraying devices 514 and 518, shown in block diagram form in FIG. 6B, which may be controlled by control device 507.

FIGS. 7A-C show top views of scouring attachments 600, 610, and 620, respectively, for use with one or more of the apparatus of FIGS. 1-6. The scouring attachments 600, 610, 620 have surfaces 600a, 610a, and 620a, respectively. The scouring attachment 600 may be a vinyl coated mesh fabric over a foam sponge, wherein the vinyl coated mesh fabric is configured to contact a windshield in FIGS. 1-6. The scouring attachment 610 may be a non-scratch nylon scouring pad over a foam mat material, wherein the non-scratch nylon scouring pad may be configured to contact a windshield in FIGS. 1-6. The scouring attachment 620 may be an all-purpose white nylon/polyester mesh over a urethane sponge, with the white nylon/polyester mesh configured to contact a windshield in FIGS. 1-6.

The scouring attachments 600, 610, and 620 may all be attached to a backing which may be made of rubber, metal, or plastic backing. The combination of the backing and any one of the attachments 600, 610, and 620 may be used as the scouring attachment for any one of the scouring attachments 8c, 10c, 108c, 110c, 208c, 210c, 308c, 310c, 408c, 410c, 508c, and 510c that may attach to the members or appendages/arms 8b, 10b, 108b, 110b, 208b, 210b, 308b, 310b, 408b, 410b, 508b, and 510b, respectively.

Figure 8A:
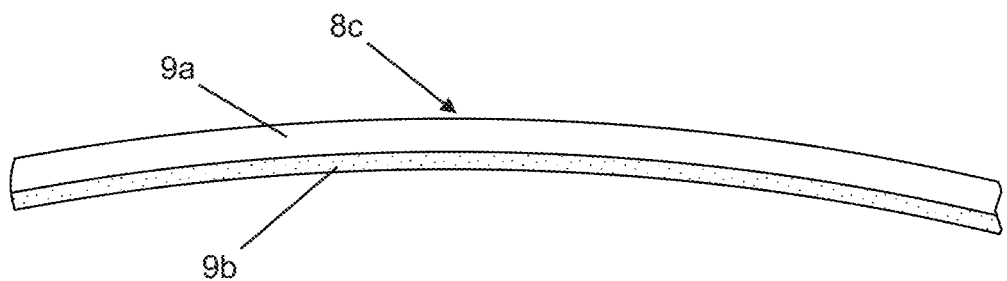
FIGS. 8A-8C show side views of members and scouring attachments for use with one or more of the apparatus of FIGS. 1-6.
Figure 8B:
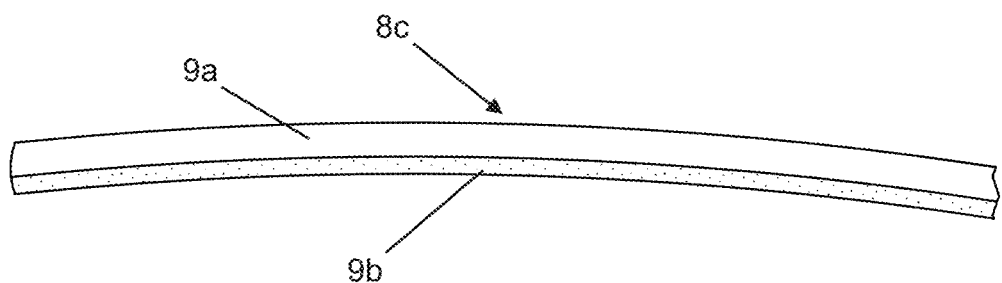
Figure 8C:
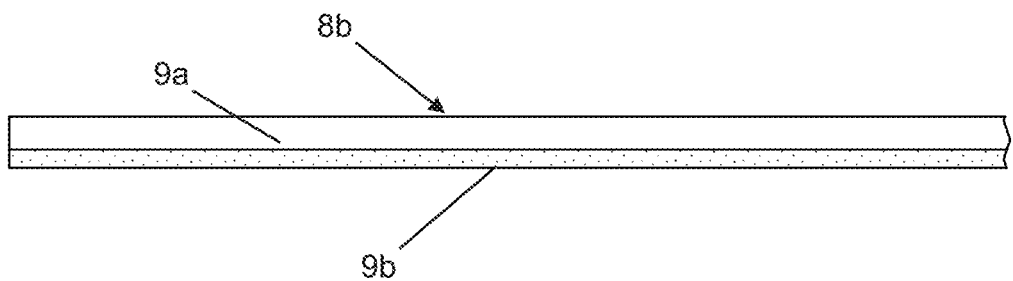

FIGS. 8A-8C show side views of part of scouring attachment 8c. The scouring attachment 8c may be identical to any of scouring attachments 10c, 108c, 110c, 208c, 210c, 308c, 310c, 408c, 410c, 508c, and 510c.

FIGS. 8A-C show that the scouring attachment 8c may be flexible. FIG. 8C shows the attachment 8c not flexed, FIG. 8B shows the attachment 8c flexed to a certain degree, and FIG. 8C shows the attachment 8c flexed to a greater degree.

The attachment 8c includes section 9a which may be made of rubber, metal, or plastic that attaches to one of the members or appendages/arms 8b, 10b, 108b, 110b, 208b, 210b, 308b, 310b, 408b, 410b, 508b, and 510b.

The attachment 8c also includes section 9b which may be a vinyl coated mesh fabric over a foam sponge, wherein the vinyl coated mesh fabric is configured to contact a windshield in FIGS. 1-6. The section 9b may be a non-scratch nylon scouring pad over a foam mat material, wherein the non-scratch nylon scouring pad may be configured to contact a windshield in FIGS. 1-6. The section 9b may be an all purpose white nylon/polyester mesh over a urethane sponge, with the white nylon/polyester mesh configured to contact a windshield in FIGS. 1-6.

The attachment 8c, including sections 9a and 9b, is flexible so that as pressure is applied to along the length thereof it will yield to the pressure applied and conform to the shape of the windshield.

FIG. 9A shows a screw going through part of an appendage or arm 702 into an unthreaded cylinder 705 that is integrated with a scouring attachment 704.

The cylinder 705 has an opening 705a, an inner chamber 705b, and a closed bottom 705c.

The appendage 702 has a threaded opening 702a. A screw or bolt 708 is shown in FIG. 9A. The screw or bolt 708 has a head portion 708a and a threaded body portion 708b. In operation the threaded body portion 708b is screwed into and partially through the opening 702a as shown in FIG. 9A, and then pushed into the unthreaded cylinder opening 705a. By screwing the screw or bolt 708, the bottom 708c of the bolt 708 pushes down on the closed bottom 705c, and thus on the scouring attachment 704 to exert pressure on the scouring attachment 704, which exerts pressure on a windshield providing a scouring feature.

The appendage 702 may not be attached by the bolt 708 to the scouring attachment 704, but rather the appendage 702 and the attachment 704 may be attached to each other by another device, which may be similar or identical to the manner in which a known windshield wiper appendage is attached to a windshield wiper blade.

The pressure mechanism shown in FIG. 9A, including the appendage 702, bolt 708, cylinder 705, and material 706, may be used in the embodiments of FIGS. 1A-6A in accordance with the present invention. The appendage 702 may be used for any of the appendages 8b, 10b, 108b, 110b, 208b, 210b, 308b, 310b, 408b, 410b, 508b, and 510b. The attachment 704 may be used for any of the attachments 8c, 10c, 108c, 110c, 208c, 210c, 308c, 310c, 408c, 410c, 508c, and 510c. The appendages 8b, 10b, 108b, 110b, 208b, 210b, 308b, 310b, 408b, 410b, 508b, and 510b may have bolt or screw 708 inserted through them as shown in FIG. 9A, and the bolt or screw 708 may be used to exert pressure on the attachments 8c, 10c, 108c, 110c, 208c, 210c, 308c, 310c, 408c, 410c, 508c, and 510c, respectively.

9B shows part of a scouring appendage 712 for exerting pressure on a scouring attachment 716 via a spring 714. The spring 714 may not connect the appendage 712 to the attachment 716, rather another mechanism similar or identical to that used in known windshield wipers may be used to connect or attach the appendage 712 to the attachment 716.

When the appendage 712 is lowered onto a windshield and the spring 714 becomes compressed this adds pressure to the attachment 716. In the lowest locked down pressure there is maximum pressure of the scouring attachment 716 on the windshield. The pressure is maintained via the lock down mechanism and the unpliable steel appendage 712 not allowing back off. The attachment 716 includes an opening 716a and a body portion 716b. The attachment 716 may be attached to a material 718 for scouring.

Figure 10A:
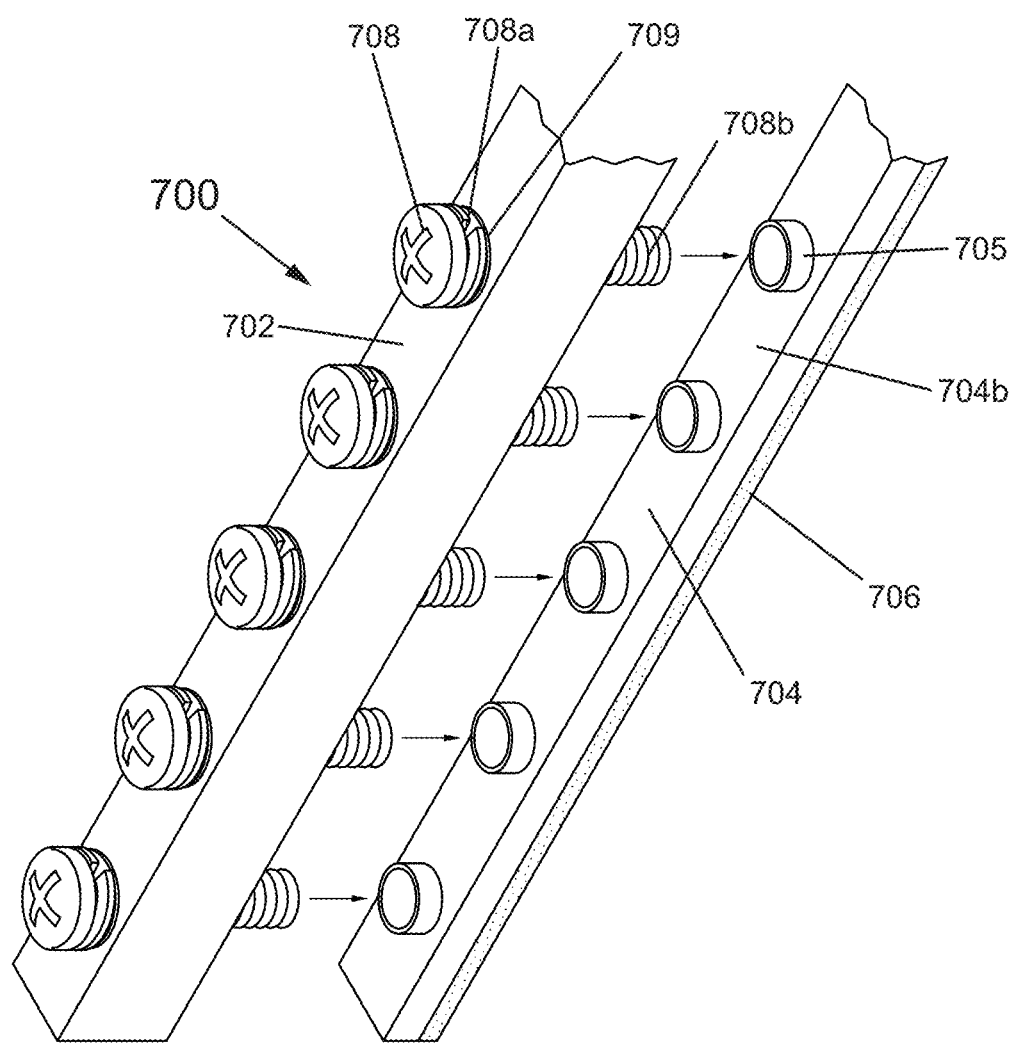
FIG. 10A shows a top and right perspective view of part of the member and the scouring attachment part of which is shown in FIG. 9A.
Figure 10B:
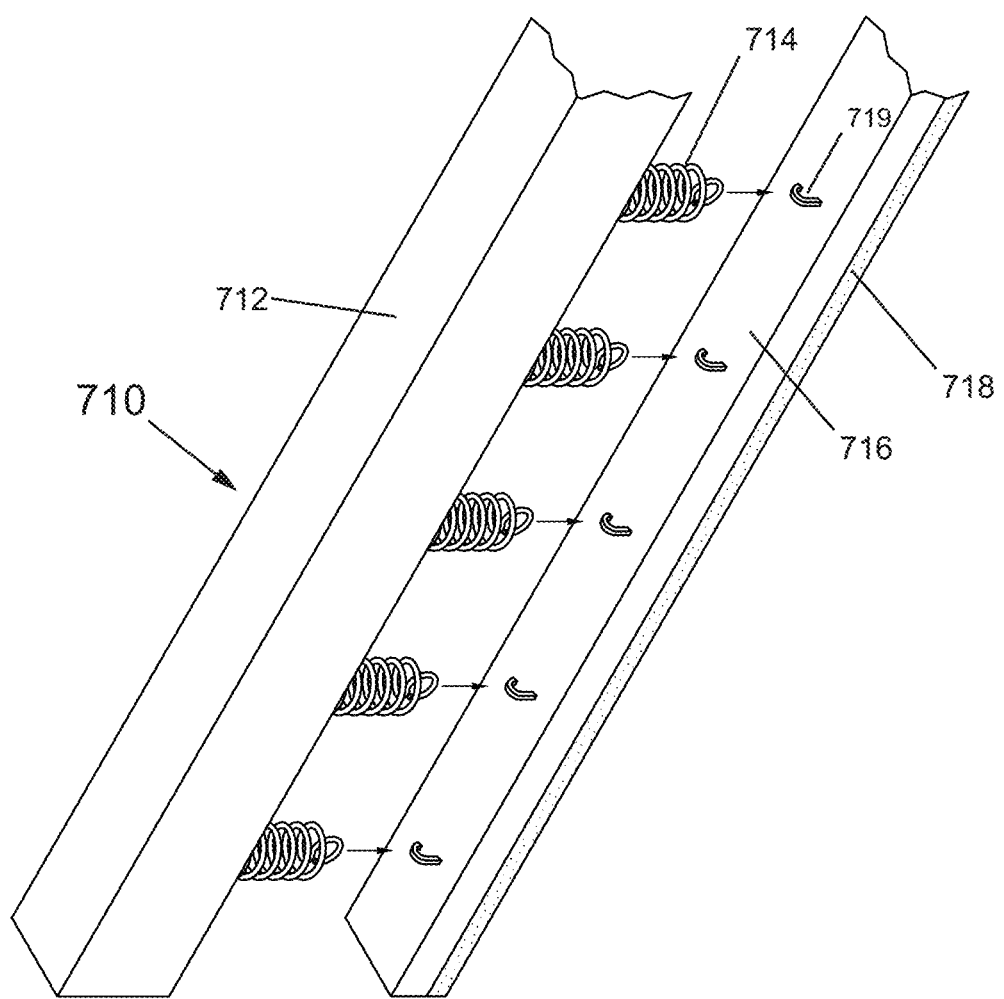
FIG. 10B shows a top and right perspective view of part of the member and the scouring attachment part of which is shown in FIG. 9B.

FIG. 10A shows a plurality of screws, each of which may be identical to screw or bolt 708 shown in FIG. 9A, going through the appendage or arm 702 into the scouring attachment 704. None of the screws or bolts 708 and similar screws or bolts in FIG. 10A may attach the appendage to the attachment 704. The slick and or unthreaded cylinders 705 and similar or identical cylinders, have a bottom 705c and identical or similar bottoms, so that when the bottoms 708c and similar bottoms of the screws or bolts 708 are turned and go down it increases pressure on the scouring attachment 704 to the windshield. There is also has a lock washer 709 so that the screws or bolts 708 will not loosen with vibration etc. FIG. 10B shows part of an appendage 712 for exerting pressure onto the scouring attachment 716 via a spring 714 and a plurality of similar or identical springs. The spring 714 and a plurality of similar or identical springs may not connect the appendage 712 to the attachment 716, rather another mechanism similar or identical to that used in known windshield wipers may be used to connect or attach the appendage 712 to the attachment 716.

The scouring attachment 716 may have attached thereto a ring or loop 719 for attaching to a spring 714, and a plurality of similar or identical springs or loops for attaching to a plurality of similar or identical springs or loops.

In FIGS. 10A and 10B a way of attaching 702 to 704 and 712 to 714, independent of screws 708 or springs 714 may be provided, which may be similar to known ways of attaching a member to a wiper blade or arm.

FIG. 11A shows a top and right perspective view of the apparatus of FIG. 10A attached to the locking mechanism 30 which is attached to the pivot member 8a. The locking mechanism 30 may include semicircular plates 32 and 36 fixed to a member 39. The plate 32 may have a plurality openings 34 including opening 34a. The plate 36 may have a plurality of openings 38 which may be aligned with and correspond with the openings 34. The appendage or member 702 can be fixed in position relative to the plates 32 and 36 by inserting the button or protrusion 703 through one of openings 34, such as through opening 34a as shown in FIG. 11A, and simultaneously inserting another button or protrusion on the opposite side of the member 702, through one of the openings 38 which corresponds with and is aligned with the opening 34a. This holds the member 702 to the windshield 20 in FIG. 1A, so that the scouring member 706 presses against the windshield 20 surface, and cannot be lifted up or rotated up in the direction C10 without removing the button 703 from the opening 34a and also removing the corresponding button on the opposite side of member 702 from the appropriate opening of openings 38. The member 39 may have a stop portion underneath the member 702 which prevents upward rotation in the direction C10, off of the windshield 20. When the button or protrusion 703 is pushed and/or removed from the opening 34a and the similar button or protrusion is removed from the appropriate opening of openings 38, then the member can be rotated in the direction C10 off of the windshield 20 or simply removed.

Similarly, or identically, FIG. 11B shows a top and right perspective view of the apparatus 710 of FIG. 10B attached to the locking mechanism 30 which is attached to a pivot member 8a. The appendage or member 712 can be fixed in position relative to the plates 32 and 36 by inserting the button or protrusion 713 through one of openings 34, such as through opening 34a as shown in FIG. 11B, and simultaneously inserting another button or protrusion on the opposite side of the member 712, through one of the openings 38 which corresponds with and is aligned with the opening 34a. This holds the member 712 to the windshield 20 in FIG. 1A, so that the scouring member 718 or pad presses against the windshield 20 surface, and cannot be lifted up or rotated up in the direction C10, which is perpendicular or substantially perpendicular, to the directions C1 and C9 without removing the button 713 from the opening 34a and also removing the corresponding button on the opposite side of member 712 from the appropriate opening of openings 38. The member 39 may have a stop portion underneath the member 712 which prevents upward rotation in the direction C10, off of the windshield 20. When the button or protrusion 713 is pushed and/or removed from the opening 34a and the similar button or protrusion is removed from the appropriate opening of openings 38, then the member can be rotated in the direction C10 off of the windshield 20 or simply removed.

An optional pin 701 shown in dashed lines in FIG. 11A, may be used to hold member or appendage 702 to attachment 704, even if the screws or bolts 708 are all no longer in their corresponding cylinders 705. The attachment 704 may slide up and down on the pin 701 coming closer to the appendage 702 and then separating farther away from the appendage 702.

Similarly or identically, an optional pin 711 shown in dashed lines in FIG. 11B, may be used to hold member or appendage 712 to attachment 716, even if the springs 714 are all no longer connected to loops 719. The attachment 716 may slide up and down on the pin 711 coming closer to the appendage 712 and then separating farther away from the appendage 712.

The appendages, such as appendage 8b, and replaceable scouring attachments, such as attachment 8c, can be made of any kind and or combination of materials. However, it is critical and preferred in at least one embodiment that the material that the appendages, such as 8b, are made of will be a type and or combination of unpliable metal(s) such as: Steel, Titanium, Tungsten, or Inconel, and the portion of attachments 8c that scourers and comes in contact with the windshield 2 will be any type of material that is rough enough to effectively scour the windshield without leaving it scratched or damaged, such as: nylon scouring pads or a vinyl coated mesh attached to and covering rubber or foam. The rubber and foam would typically not come in contact with the windshield 20.

The power-driven appendages, such as appendage 8b and joined scouring attachments, such as 8c, in at least one embodiment, are equal (or nearly equal) in length and similar in width, and these dimensions in one or more embodiment are critical. This is done so that a means can be implemented to exert pressure from the appendages, such as 8b, to the scouring attachment, 8c, in an substantially uniformly or evenly applied manner, forcing the scouring attachment such as 8c, to be pressured/pressed hard against the windshield 20. Thus, making the attachments motorized scourers.

In order to exert and maintain maximum pressure from the appendage 8b to the scouring attachment 8c so that the scouring attachment 8c stays pressed hard against the windshield 20; the appendage 8b is connected to the lock down mechanism 30, in at least one embodiment. Accordingly, when pressure is exerted and increased from the appendage 8b to the attachments 8c, the locked down unpliable appendage 8b will not back off or bend. Thus, sustaining the necessary pressure for the attachment 8c to effectively scour the windshield 20, as opposed to just wiping any implement across the surface of the windshield 20.

The motorized scourer will operate autonomously in at least one embodiment, nevertheless one skilled in the art can design it to run in sync with any windshield wiping system and or off the same motor as the windshield wipers or devices, such as 12 and 16.

The motorized windshield scourer has its own or shares a reservoir of windshield washer fluid, such as 15 shown in FIG. 1B, with that of the windshield wiper system or devices 12 and 16; and either has its own motorized pump or will rely on the windshield wiper system pump to eject the windshield washer fluid onto the windshield 20.

After the windshield washer fluid has been excreted onto the windshield 20 via a motorized pump, such as known in the art, the motorized windshield scourer or devices 8 and 10, and other devices shown in FIGS. 1A-6A, will be turned on to scour the windshield 20 of splatted on vision impairing foreign matter such as insect residue and the like.

Once the motorized windshield scourer or devices 8 and 10 has liberated the stuck-on vision impairing foreign matter from the windshield, the known windshield wipers or devices 12 and 16 will be activated to squeegee off the liberated foreign matter and dirty cleaning fluid. Thus, the motorized scourer or devices 8 and 10 working in conjunction with the windshield wiper system or known devices 12 and 16 will be performing the same function as the hand held manual windshield scourer/squeegee currently being used by motorists today.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a first windshield scouring device;
wherein the first windshield scouring device includes
  a first appendage;
  a first scouring attachment; and
  a first rod;
    wherein the first rod is configured to exert a varying amount of pressure on the first scouring attachment when the first scouring attachment is pressing against a windshield;
  wherein the first appendage is configured to cause rotation of the first scouring attachment in response to a motor, when the first scouring attachment is pressed against the windshield;
  wherein the first rod has a bottom, and wherein the first rod exerts the varying amount of pressure on the first scouring attachment by the bottom of the first rod indirectly pressing on the first scouring attachment; and
  wherein the first scouring attachment includes
    a flexible backing;
    a nylon material attached to a foam mat material attached to the flexible backing;
    and a sponge like material covered by a vinyl coated mesh material.

2. The apparatus of claim 1 wherein
the first rod is a threaded fastener;
and further comprising a first unthreaded cylinder integrated with the first scouring attachment; and
wherein the bottom of the first rod directly presses on a bottom of the first unthreaded cylinder to press the first scouring attachment against the windshield.

3. The apparatus of claim 1 further comprising
a second windshield scouring device;
wherein the second windshield scouring device includes
  a second appendage;
  a second scouring attachment;

a second rod;
wherein the second rod is configured to exert a varying amount of pressure on the second scouring attachment when the second scouring attachment is pressing against a windshield;
and wherein the second appendage is configured to cause rotation of the second scouring attachment in response to a motor, when the second scouring attachment is pressed against the windshield; and
wherein the second rod has a bottom, and wherein the second rod exerts the varying amount of pressure on the second scouring attachment by the bottom of the second rod indirectly pressing on the second scouring attachment.

4. The apparatus of claim 3 wherein
the first rod is a threaded fastener;
wherein a first unthreaded cylinder is integrated with the first scouring attachment;
wherein the bottom of the first rod directly presses on a bottom of the first unthreaded cylinder to press the first scouring attachment against the windshield;
wherein the second rod is a threaded fastener;
and further comprising a second unthreaded cylinder integrated with the second scouring attachment; and
wherein the bottom of the second rod directly presses on a bottom of the second unthreaded cylinder to press the second scouring attachment against the windshield.

5. An apparatus comprising
a first windshield scouring device;
wherein the first windshield scouring device includes
a first appendage;
a first scouring attachment;
a first means for exerting a varying an amount of pressure on the first scouring attachment when the first scouring attachment is pressing against a windshield;
wherein the first appendage is configured to cause rotation of the first scouring attachment in response to a motor, when the first scouring attachment is pressed against the windshield; and further comprising:
a first locking mechanism which prevents the first appendage from lifting and which prevents the first scouring attachment from lifting off of the windshield when pressure is applied from the first appendage to the first scouring attachment, and when the first scouring attachment is in contact with the windshield; and
wherein the first scouring attachment includes
a flexible backing;
a nylon material attached to a foam mat material attached to the flexible backing;
and a sponge like material covered by a vinyl coated mesh material.

6. The apparatus of claim 5 further comprising
a second windshield scouring device;
wherein the second windshield scouring device includes
a second appendage;
a second scouring attachment;
a second means for exerting a varying an amount of pressure on the second scouring attachment when the second scouring attachment is pressing against a windshield;
wherein the second appendage is configured to cause rotation of the second scouring attachment in response to a motor, when the second scouring attachment is pressed against the windshield; and further comprising:
a second locking mechanism which prevents the second appendage from lifting and which prevents the first scouring attachment from lifting off of the windshield when pressure is applied from the second appendage to the second scouring attachment, and when the second scouring attachment is in contact with the windshield; and
wherein the second scouring attachment includes
a flexible backing;
a nylon material attached to a foam mat material attached to the flexible backing;
and a sponge like material covered by a vinyl coated mesh material.

7. An apparatus comprising
a first windshield scouring device;
wherein the first windshield scouring device includes
a first appendage;
a first scouring attachment;
a first means for exerting a varying an amount of pressure on the first scouring attachment when the first scouring attachment is pressing against a windshield;
wherein the first appendage is configured to cause rotation of the first scouring attachment in response to a motor, when the first scouring attachment is pressed against the windshield; and
wherein the first scouring attachment includes
a flexible backing;
a nylon material attached to a foam mat material attached to the flexible backing;
and a sponge like material covered by a vinyl coated mesh material.

8. The apparatus of claim 7 further comprising
a second windshield scouring device;
wherein the second windshield scouring device includes
a second appendage;
a second scouring attachment;
a second means for exerting a varying an amount of pressure on the second scouring attachment when the second scouring attachment is pressing against a windshield;
wherein the second appendage is configured to cause rotation of the second scouring attachment in response to a motor, when the second scouring attachment is pressed against the windshield
wherein the second scouring attachment includes:
a flexible backing,
a nylon material attached to a foam mat material attached to the flexible backing of the second scouring attachment;
and a sponge like material covered by a vinyl coated mesh material.

9. The apparatus of claim 1 further comprising
a first windshield wiper device;
and wherein the first scouring device operates autonomously separate and apart from the first windshield wiper device.

10. The apparatus of claim 1 further comprising
a first windshield wiper device; and
wherein the first windshield wiper device and the first scouring device are controlled to operate in sequence to clean substantially the same half of the windshield.

11. The apparatus of claim 3 further comprising
a first windshield wiper device; and
wherein the first windshield wiper device and the first scouring device are controlled to operate in sequence to clean substantially the same first half of the windshield;
and further comprising a second windshield wiper device; and wherein the second windshield wiper device and the second scouring device are controlled to operate in sequence to clean substantially the same second half of the windshield which is different from the first half.

12. A method of using an apparatus, the apparatus comprising
a first windshield scouring device;
wherein the first windshield scouring device includes
a first appendage;
a first scouring attachment;
a first means for exerting a varying an amount of pressure on the first scouring attachment when the first scouring attachment is pressing against a windshield;
wherein the first appendage is configured to cause rotation of the first scouring attachment in response to a motor, when the first scouring attachment is pressed against the windshield; and
wherein the method comprises:
applying a varying amount of pressure to the first scouring attachment when the first scouring attachment is pressed against the windshield;
wherein the first appendage is configured to cause rotation of the first scouring attachment in response to a motor, when the first scouring attachment is pressed against the windshield; and
wherein the first scouring attachment includes
a flexible backing,
a nylon material attached to a foam mat material attached to the flexible backing;
and a sponge like material covered by a vinyl coated mesh attached to the flexible backing.

13. The method of claim 12 wherein the apparatus further comprises
a second windshield scouring device;
wherein the second windshield scouring device includes
a second appendage;
a second scouring attachment;
a second means for exerting a varying an amount of pressure on the second scouring attachment when the second scouring attachment is pressing against a windshield;
wherein the second appendage is configured to cause rotation of the second scouring attachment in response to a motor, when second scouring attachment is pressed against the windshield; and
wherein the method comprises:
applying a varying amount of pressure to the second scouring attachment when the second scouring attachment is pressed against the windshield;
wherein the second scouring attachment includes:
a second flexible backing,
a nylon material attached to a foam mat material attached to the second flexible backing;
and a sponge like material covered by a vinyl coated mesh attached to the second flexible backing.

14. The apparatus of claim 5 wherein
the first appendage is configured to be rotatably mounted to a frame of a vehicle, so that the first appendage can be rotated thereby causing the first scouring attachment to scour the vehicle windshield, and simultaneously preventing the first scouring attachment from lifting off of the vehicle windshield when the first locking mechanism is in a locked state.

15. The apparatus of claim 14 wherein
the first locking mechanism includes at least a first button which in inserted into an opening of a member when the first locking mechanism is in the locked state.

16. The apparatus of claim 2
wherein the first windshield scouring device further includes
a second rod;
wherein the second rod in conjunction with the first rod is configured to exert a varying amount of pressure on the first scouring attachment when the first scouring attachment is pressing against a windshield; and
wherein the second rod has a bottom, and wherein the second rod exerts the varying amount of pressure on the first scouring attachment by the bottom of the second rod directly pressing on the first scouring attachment at a first location, while the bottom of the first rod indirectly presses on the first scouring attachment at a second location different from the first location.

17. The apparatus of claim 16 wherein
the first rod is a threaded fastener;
the second rod is a threaded fastener;
wherein a first unthreaded cylinder is integrated with the first scouring attachment at the first location;
wherein a second unthreaded cylinder is integrated with the first scouring attachment at the second location;
wherein the bottom of the first rod directly presses on a bottom of the first unthreaded cylinder to press the first scouring attachment against the windshield; and
wherein the bottom of the second rod directly presses on a bottom of the second unthreaded cylinder to press the first scouring attachment against the windshield.

* * * * *